(12) United States Patent
Karino et al.

(10) Patent No.: US 11,755,105 B2
(45) Date of Patent: Sep. 12, 2023

(54) INFORMATION PROCESSING APPARATUS, INFORMATION PROCESSING SYSTEM, INFORMATION PROCESSING METHOD, AND PROGRAM

(71) Applicant: FUJIFILM Corporation, Tokyo (JP)

(72) Inventors: Takatoshi Karino, Tokyo (JP); Kazuyuki Itagaki, Tokyo (JP); Makoto Ozeki, Tokyo (JP); Shinji Hayashi, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 281 days.

(21) Appl. No.: 17/171,209

(22) Filed: Feb. 9, 2021

(65) Prior Publication Data

US 2021/0165483 A1    Jun. 3, 2021

Related U.S. Application Data

(63) Continuation of application No. PCT/JP2019/028301, filed on Jul. 18, 2019.

(30) Foreign Application Priority Data

Sep. 20, 2018   (JP) ................................ 2018-175671

(51) Int. Cl.
*G06F 3/01* (2006.01)
*G06T 7/55* (2017.01)
(Continued)

(52) U.S. Cl.
CPC .............. *G06F 3/013* (2013.01); *G06F 3/015* (2013.01); *G06T 7/55* (2017.01); *G06V 40/176* (2022.01);
(Continued)

(58) Field of Classification Search
CPC .... G06F 3/011; G06F 3/0481; G06F 3/04815; G06T 19/20; G06T 19/006; G06T 19/003;
(Continued)

(56) References Cited

U.S. PATENT DOCUMENTS 10,048,750 B2 *   8/2018  Du ...................... G02B 27/017
10,078,919 B2 *   9/2018  Powderly ............. G06T 19/006
(Continued)

FOREIGN PATENT DOCUMENTS

JP    H06-332024 A    12/1994
JP    2001-184378 A    7/2001
(Continued)

OTHER PUBLICATIONS

International Search Report issued in PCT/JP2019/028301; dated Oct. 8, 2019.
(Continued)

*Primary Examiner* — William Lu
(74) *Attorney, Agent, or Firm* — Studebaker & Brackett PC

(57) ABSTRACT

The information processing apparatus includes a space information acquisition unit that acquires space information based on the space sensing information, an object information acquisition unit that acquires object information, a user information acquisition unit that acquires user information based on the user sensing information, an attention level map creation unit that creates an attention level map showing an attention level of the user for each local area of the space, a goodness-of-fit map creation unit that creates a goodness-of-fit map showing a goodness-of-fit of the object for each local area, and a proposing unit that proposes a disposition of the object in the space on the basis of the attention level map and the goodness-of-fit map.

18 Claims, 18 Drawing Sheets

US 11,755,105 B2
Page 2

(51) Int. Cl.
*H04N 1/00* (2006.01)
*G06V 40/16* (2022.01)

(52) U.S. Cl.
CPC ..... *H04N 1/0023* (2013.01); *G06F 2203/011* (2013.01)

(58) Field of Classification Search
CPC ..... G06T 2219/2004; G06T 2219/2016; G06T 2200/24
See application file for complete search history.

(56) References Cited

U.S. PATENT DOCUMENTS

| | | | | |
|---|---|---|---|---|
| 10,163,010 | B2* | 12/2018 | Kaehler | G02B 27/017 |
| 10,281,744 | B2* | 5/2019 | Sabovic | G02C 7/083 |
| 10,514,541 | B2* | 12/2019 | Tantos | H03M 13/356 |
| 10,521,025 | B2* | 12/2019 | Powderly | G06F 3/017 |
| 2007/0247524 | A1* | 10/2007 | Yoshinaga | G06V 40/193 |
| | | | | 348/78 |
| 2012/0127062 | A1* | 5/2012 | Bar-Zeev | G06T 19/006 |
| | | | | 345/6 |
| 2014/0070957 | A1* | 3/2014 | Longinotti-Buitoni | A61B 5/02055 |
| | | | | 340/870.01 |
| 2014/0176608 | A1* | 6/2014 | Boysen | H04N 1/00127 |
| | | | | 345/633 |
| 2014/0318699 | A1* | 10/2014 | Longinotti-Buitoni | H05K 1/038 |
| | | | | 156/247 |
| 2015/0070386 | A1* | 3/2015 | Ferens | G06F 3/013 |
| | | | | 345/633 |
| 2015/0206353 | A1* | 7/2015 | Grasso | G06T 19/006 |
| | | | | 345/633 |
| 2016/0167672 | A1* | 6/2016 | Krueger | G16H 40/63 |
| | | | | 340/576 |
| 2016/0188962 | A1* | 6/2016 | Taguchi | G06V 40/193 |
| | | | | 382/117 |
| 2017/0196513 | A1* | 7/2017 | Longinotti-Buitoni | A61B 5/7405 |
| 2017/0205892 | A1* | 7/2017 | Petrovskaya | G06F 3/011 |
| 2017/0256096 | A1* | 9/2017 | Faaborg | G06F 3/011 |
| 2018/0024630 | A1* | 1/2018 | Goossens | G09G 5/14 |
| | | | | 345/156 |
| 2018/0096503 | A1* | 4/2018 | Kaehler | G06V 20/20 |
| 2018/0182142 | A1* | 6/2018 | Lim | G06F 16/252 |
| 2018/0240220 | A1* | 8/2018 | Katori | G06T 7/20 |
| 2018/0276894 | A1* | 9/2018 | Chang | G06F 3/012 |
| 2019/0096105 | A1* | 3/2019 | Osotio | G06T 19/00 |
| 2019/0132948 | A1* | 5/2019 | Longinotti-Buitoni | A61B 5/743 |
| 2019/0174170 | A1* | 6/2019 | Chen | G06F 3/0346 |
| 2019/0268587 | A1* | 8/2019 | Sato | H04N 23/90 |
| 2020/0226823 | A1* | 7/2020 | Stachniak | G06T 19/006 |
| 2021/0097768 | A1* | 4/2021 | Malia | G06F 3/0488 |
| 2021/0133850 | A1* | 5/2021 | Ayush | G06V 10/22 |
| 2021/0158623 | A1* | 5/2021 | Suzuki | G06F 3/0484 |
| 2021/0195732 | A1* | 6/2021 | Longinotti-Buitoni | H05K 3/361 |

FOREIGN PATENT DOCUMENTS

| | | |
|---|---|---|
| JP | 2007-286995 A | 11/2007 |
| JP | 2015-049548 A | 3/2015 |
| JP | 2017-68851 A | 4/2017 |
| JP | 2018-85571 A | 5/2018 |
| WO | 2017/047178 A1 | 3/2017 |

OTHER PUBLICATIONS

International Preliminary Report on Patentability and Written Opinion issued in PCT/JP2019/028301; dated Mar. 23, 2021.
"What is RoomCo NAVI, Room Coordination application "RoomCo AR"?", 2018, pp. 1-10, Internet <URL: https://www.roomco.jp/info/roomco-ar.html>.
"Wired, Insight Oct. 6, 2017 Fri 07:00, pp. 1-5, IKEA introduces AR to smartphone application and fundamentally changes "how to buy furniture"", Internet <URL:https://wired.jp/2017/10/06/ikea-place-augmented-reality/>.
"APPPLA, Beautiful.AI", 2019, pp. 1-2, InnovationPlace Inc. Internet <URL:https://www.appp.la/posts/beautiful_ai>.
"Dream Pages", Retrieved Sep. 29, 2016, pp. 1-2, DNP Photo Imaging Japan Co., Ltd. Internet <URL: https://dnp-photobook.jp/recommend/easy-photobook.html>.

* cited by examiner

INFORMATION PROCESSING APPARATUS, INFORMATION PROCESSING SYSTEM, INFORMATION PROCESSING METHOD, AND PROGRAM

CROSS-REFERENCE TO RELATED APPLICATIONS

This application is a Continuation of PCT International Application No. PCT/JP2019/028301 filed on Jul. 18, 2019, which claims priority under 35 U.S.C § 119(a) to Japanese Patent Application No. 2018-175671 filed on Sep. 20, 2018. Each of the above application(s) is hereby expressly incorporated by reference, in its entirety, into the present application.

BACKGROUND OF THE INVENTION

1. Field of the Invention

The present invention relates to an information processing apparatus, an information processing system, an information processing method, and a program, and particularly relates to an object layout proposal.

2. Description of the Related Art

Augmented reality is known to extend the real environment using a computer. For example, an AR framework can recognize a space from imaging data obtained by imaging a room with a camera. Then, it is possible to dispose objects such as furniture in the space recognized from the imaging data using AR. It should be noted that augmented reality may be called AR using the abbreviation of augmented reality, which is an English notation.

"What is RoomCo NAVI, Room Coordination application "RoomCo AR"?", Internet <URL: https://www.roomco.jp/info/roomco-ar.html> discloses a room coordination application software that operates using a smartphone or the like. The application software disclosed in the same document selects a space in which an object such as furniture is to be disposed, selects an object in which the object is to be disposed, and sets a disposition of the object in the selected space, and displays the space in which the object is coordinated on a display apparatus provided in a smartphone or the like.

"WIRED, INSIGHT 2017.10.06 FRI 07:00 IKEA introduces AR to smartphone application and fundamentally changes "how to buy furniture"", Internet <URL:https://wired.jp/2017/10/06/ikea-place-augmented-reality/> discloses an application software that utilizes AR technology to display a state in which full-scale furniture is installed in a room on a display apparatus provided in a smartphone or the like.

"APPPLA, Beautiful.AI", Internet <URL:https://www.appp.la/posts/beautiful_ai> discloses a slide creation tool that optimizes the layout and disposition of materials and animates the materials using artificial intelligence (AI). "Dream Pages", Internet <URL: https://dnp-photobook.jp/recommend/easy-photobook.html> discloses an application software that performs automatic layout of an image.

In recent years, smartphones comprising an in-camera including a plurality of sensors such as an imaging element, an infrared sensor, and an ambient light sensor have been known. In addition, wearables that can acquire biological information such as heartbeats are known.

JP2017-068851A discloses an information processing apparatus that can specify whether or not an experiencer has focused on a subject in a three-dimensional space. The information processing apparatus disclosed in the same document specifies an object that the user is paying attention to from a position of a display apparatus in the three-dimensional space, a line of sight of the user, and a position of the object in the three-dimensional space.

WO20117/047178A discloses user information applied in a case of controlling a display of a virtual object. JP2018-085571A discloses an information processing system in which a sensor is disposed in a real space and the sensor is used to acquire three-dimensional information of the entire real space.

SUMMARY OF THE INVENTION

However, the room coordination application software disclosed in "What is RoomCo NAVI, Room Coordination application "RoomCo AR"?", Internet <URL: https://www-.roomco.jp/info/roomco-ar.html> visualizes the state in which the set object is disposed with respect to the designated position of the space, but the proposal of the layout of the object is not considered.

The application software disclosed in "WIRED, INSIGHT 2017.10.06 FRI 07:00 IKEA introduces AR to smartphone application and fundamentally changes "how to buy furniture"", Internet <URL:https://wired.jp/2017/10/06/ikea-place-augmented-reality/> automatically proposes the layout of object, but the proposed layout of object is not considered to be personalized for each user.

"APPPLA, Beautiful.AI", Internet <URL:https://www.appp.la/posts/beautiful_ai> and "Dream Pages", Internet <URL: https://dnp-photobook.jp/recommend/easy-photobook.html> disclose a technique for performing automatic layout of document, image, and the like, but do not disclose a technique for the automatic layout of the object disposed in space.

The invention disclosed in JP1994-332024A specifies an object that a user has focused on for an object existing in space, but does not consider proposing a layout of the object disposed in space.

WO2017/047178A discloses the user information applied in a case of controlling the display of the virtual object, but does not disclose a technique for proposing the layout of the object disposed in space.

JP1994-332024A discloses a technique for acquiring three-dimensional information in real space using a sensor, but does not disclose a technique for proposing the automatic layout of the object disposed in space.

The present invention has been made considering such problems, and an object of the present invention is to provide an information processing apparatus, an information processing system, an information processing method, and a program capable of proposing a layout personalized to the user of an object.

In order to achieve the above object, the following aspects of the invention are provided.

An information processing apparatus according to the first aspect is an information processing apparatus comprising a space information acquisition unit that acquires space sensing information obtained by sensing a space in which an object is disposed and acquires space information based on the space sensing information, an object information acquisition unit that acquires object information of the object, a user information acquisition unit that acquires user sensing information obtained by sensing a state of a user with respect to the space and acquires user information based on the user sensing information in a case of sensing the space, an attention level map creation unit that creates an attention level map showing an attention level of the user for each local area of the space on the basis of the space information and the user information, a goodness-of-fit map creation unit that creates a goodness-of-fit map showing a goodness-of-fit of the object for each local area on the basis of the space information and the object information, and a proposing unit that proposes a disposition of the object in the space on the basis of the attention level map and the goodness-of-fit map.

According to the first aspect, the disposition of the object in the space is proposed on the basis of the attention level map representing the attention level of the user and the goodness-of-fit map representing the goodness-of-fit of the object. Accordingly, the layout of the personalized object can be proposed to the user.

The object may include at least one of a real article or a virtual object.

Acquisition may include concepts such as generation, derivation, and readout that mean indirect acquisition that processes the information that is a source of the information to be acquired. That is, the user information acquisition unit may comprise a user information derivation unit that derives the user information from the user sensing information. In addition, the space information acquisition unit may comprise a space information derivation unit that derives the space information from the space sensing information.

The information processing apparatus according to the first aspect is an information processing apparatus comprising one or more processors and one or more memories, in which the one or more processors acquire space sensing information obtained by sensing a space in which an object is disposed and acquire object information of the object, acquire user sensing information obtained by sensing a state of a user with respect to the space and acquire user information based on the user sensing information in a case of sensing the space, create an attention level map showing an attention level of the user for each local area of the space on the basis of the space information and the user information, create a goodness-of-fit map showing a goodness-of-fit of the object for each local area on the basis of the space information and the object information, propose a disposition of the object in the space on the basis of the attention level map and the goodness-of-fit map, and the one or more memories can be configured as an information processing apparatus for storing data in each processing.

According to the second aspect, in the information processing apparatus of the first aspect, the user information acquisition unit may be configured to acquire imaging data obtained by imaging the user using an imaging apparatus as the user sensing information, and acquire at least one of an expression of the user, a line of sight of the user, or a size of a pupil of the user as the user information on the basis of the user sensing information.

According to the second aspect, the expression of the user, the line of sight of the user, and the size of the pupil of the user can be applied to the user information.

According to the third aspect, in the information processing apparatus of the first or second aspect, the user information acquisition unit may be configured to acquire at least one of a heart rate of the user, a blood pressure of the user, a body temperature of the user, a brain wave of the user, or a respiratory rate of the user measured by using a biological information measuring apparatus for measuring biological information of the user as the user sensing information.

According to the third aspect, the biological information of the user measured by using the biological information measuring apparatus can be applied to the user information.

According to the fourth aspect, in the information processing apparatus of any one of the first to third aspects, the space information acquisition unit may be configured to acquire imaging data obtained by imaging the space using an imaging apparatus for imaging the space as the space sensing information.

According to the fourth aspect, the imaging data obtained by imaging the space using the imaging apparatus can be acquired as the space sensing information.

According to the fifth aspect, in the information processing apparatus of any one of the first to fourth aspects, the space information acquisition unit may be configured to acquire information on a constitutional element of the space from imaging data obtained by imaging the space using an imaging apparatus for imaging the space.

According to the fifth aspect, the information of the constitutional element of the space obtained from the imaging data can be applied to the space information.

According to the sixth aspect, in the information processing apparatus of any one of the first to fifth aspects, the space information acquisition unit may be configured to acquire at least one of the information on a width of the space, a shape of the space, a color of the space, or light of the space as the space information.

According to the sixth aspect, at least one of information on the width of the space, the shape of the space, the color of the space, and the light of the space can be applied to the space information.

In the sixth aspect, the space information acquisition unit can acquire at least one of the information on the space width, the width of the space, the shape of the space, the color of the space, and the light of the space, from imaging data of the space obtained by imaging the space using the imaging apparatus for imaging the space, as space information.

According to the seventh aspect, in the information processing apparatus of any one of the first to sixth aspects, the object information acquisition unit may be configured to acquire at least one of a size of the object, a shape of the object, or a color of the object as the object information.

According to the seventh aspect, at least one of the size of the object, the shape of the object, and the color of the object can be applied to the object information.

According to the eighth aspect, in the information processing apparatus of any one of the first to seventh aspects, the proposing unit may be configured to create image data representing the space in which the object is disposed.

According to the eighth aspect, the disposition of the object in the space can be proposed by using the image data representing the space in which the object is disposed.

In the information processing apparatus of the eighth aspect, the ninth aspect may be configured to comprise a signal transmission unit that transmits a signal representing the image data to a display apparatus.

According to the ninth aspect, a proposal for the disposition of object in the space can be displayed using the display apparatus.

In the information processing apparatus of the eighth aspect, the tenth aspect may be configured to comprise a signal transmission unit that transmits the image data to a printing apparatus.

According to the tenth aspect, the proposal for the disposition of object in the space can be printed using the printing apparatus.

The information processing system according to the eleventh aspect is an information processing system comprising a server apparatus that is connected to a network, in which the server apparatus includes a space information acquisition unit that acquires space sensing information obtained by sensing a space in which an object is disposed and acquires space information based on the space sensing information, an object information acquisition unit that acquires object information of the object, a user information acquisition unit that acquires user sensing information obtained by sensing a state of a user with respect to the space and acquires user information based on the user sensing information in a case of sensing the space, an attention level map creation unit that creates an attention level map showing an attention level of the user for each local area of the space on the basis of the space information and the user information, a goodness-of-fit map creation unit that creates a goodness-of-fit map showing a goodness-of-fit of the object for each local area on the basis of the space information and the object information, and a proposing unit that proposes a disposition of the object in the space on the basis of the attention level map and the goodness-of-fit map.

According to the eleventh aspect, it is possible to obtain the same effect as the first aspect.

In the eleventh aspect, the same items as those specified in the second to tenth aspects can be appropriately combined. In that case, the constitutional element responsible for the processing or function specified in the information processing apparatus can be grasped as the constitutional element of the information processing system responsible for the corresponding processing or function.

The information processing method according to the twelfth aspect is an information processing method comprising a space information acquisition step of acquiring space sensing information obtained by sensing a space in which objects are disposed and acquires space information based on the space sensing information, an object information acquisition step of acquiring object information of the object, a user information acquisition step of acquiring user sensing information obtained by sensing a state of a user with respect to the space and acquires user information based on the user sensing information in a case of sensing the space, an attention level map creation step of creating an attention level map showing an attention level of the user for each local area of the space on the basis of the space information and the user information, a goodness-of-fit map creation step of creating a goodness-of-fit map showing a goodness-of-fit of the object for each local area on the basis of the space information and the object information, and a proposing step of proposing a disposition of the object in the space on the basis of the attention level map and the goodness-of-fit map.

According to the twelfth aspect, it is possible to obtain the same effect as the first aspect.

In the twelfth aspect, the same items as those specified in the second to tenth aspects can be appropriately combined. In that case, the constitutional element responsible for the processing or function specified in the information processing apparatus can be grasped as the constitutional element of the information processing method responsible for the corresponding processing or function.

The program according to the thirteenth aspect is a program for causing a computer to implement a space information acquisition function of acquiring space sensing information obtained by sensing a space in which an object is disposed and acquiring space information based on the space sensing information, an object information acquisition function of acquiring object information of the object, a user information acquisition function of acquiring user sensing information obtained by sensing a state of a user with respect to the space and acquiring user information based on the user sensing information in a case of sensing the space, an attention level map creation function of creating an attention level map showing an attention level of the user for each local area of the space on the basis of the space information and the user information, a goodness-of-fit map creation function of creating a goodness-of-fit map showing a goodness-of-fit of the object for each local area on the basis of the space information and the object information, and a proposing function of proposing a disposition of the object in the space on the basis of the attention level map and the goodness-of-fit map.

According to the thirteenth aspect, it is possible to obtain the same effect as the first aspect.

In the thirteenth aspect, the same items as those specified in the second to tenth aspects can be appropriately combined. In that case, the constitutional element responsible for the processing or function specified in the image processing apparatus can be grasped as the constitutional element of the program responsible for the corresponding processing or function.

According to the present invention, the disposition of the object in the space is proposed on the basis of the attention level map representing the attention level of the user and the goodness-of-fit map representing the goodness-of-fit of the object. Accordingly, the layout of the personalized object can be proposed to the user.

DESCRIPTION OF THE PREFERRED EMBODIMENTS

Figure 1:
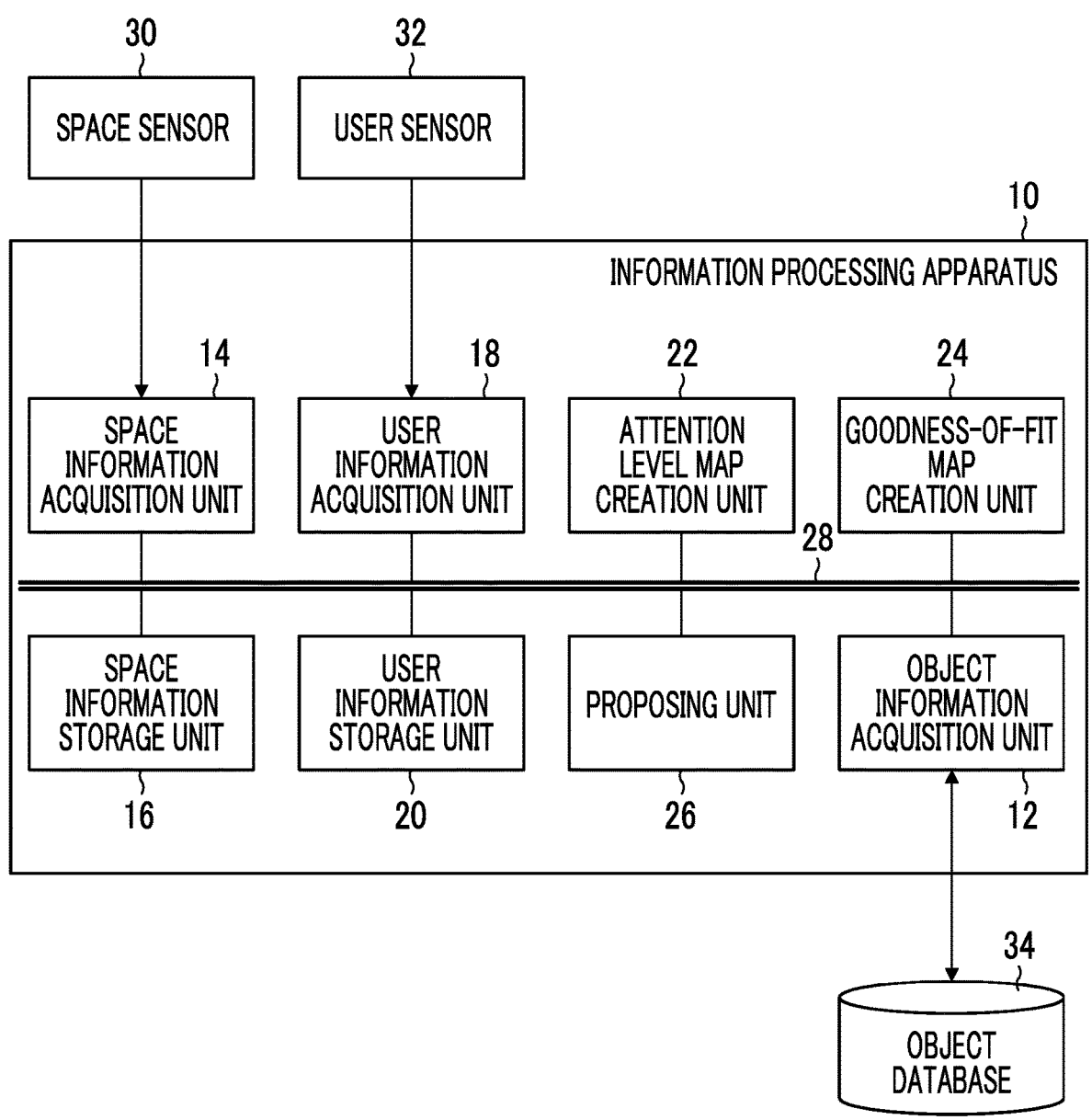
FIG. 1 is a functional block diagram of an information processing apparatus.

Hereinafter, aspects for performing the invention according to the accompanying drawings will be described in detail. In the present specification, the same constitutional elements are designated by the same reference numerals, and duplicate description will be omitted as appropriate.

[Explanation of Information Processing Apparatus]
[Explanation of Functional Block]

FIG. 1 is a functional block diagram of an information processing apparatus. The information processing apparatus 10 shown in FIG. 1 comprises an object information acquisition unit 12, a space information acquisition unit 14, a space information storage unit 16, a user information acquisition unit 18, a user information storage unit 20, an attention level map creation unit 22, a goodness-of-fit map creation unit 24, and a proposing unit 26. The above-described each unit constituting the information processing apparatus 10 is communicably connected via a bus 28.

In a case where an object selected by a user is disposed in a space, the information processing apparatus 10 automatically proposes an optimum layout of the object personalized according to the state of the user in a case of sensing the space. It should be noted that in the present specification, the term layout and the term disposition can be interchanged with each other.

The object referred to here may be a real article such as a photograph, a painting, and furniture, or a virtual object created by using AR or the like. In addition, the space may be either indoors or outdoors.

The object information acquisition unit 12 acquires object information in an object selected by a user by using identification information of the object selected by using a user terminal such as a smartphone.

The object information may be applied to at least one of the size of the object, the shape of the object, or the color of the object. The object information may include a type of the object, a manufacturer of the object, a seller of the object, a price of the object, an inventory status of the object, and an estimated date of acquisition of the object.

The space information acquisition unit 14 acquires space sensing information obtained by sensing the space using the space sensor 30 such as the imaging apparatus, and derives space information based on the space sensing information. In a case where the space sensor 30 is an imaging apparatus, the space imaging data becomes the space sensing information. An infrared device, a sound wave device, or the like may be applied to the space sensor 30. The space information acquisition unit 14 stores space information in the space information storage unit 16.

For the space information, a map of the space to be sensed can be applied. In a case where the space is indoors, the space information may include constitutional elements of the space such as furniture and walls. The space information may include the direction of light irradiating the space, the amount of light, the wavelength of light, and the like. The light referred to here may include at least one of natural light or illumination light.

The user information acquisition unit 18 acquires user sensing information obtained by sensing the state of a user with respect to a space by using a user sensor 32 such as an imaging apparatus, and derives user information based on the user sensing information. The user information acquisition unit 18 stores the user information in the user information storage unit 20. As the user sensor 32, an infrared device, a sound wave device, or the like may be applied.

As the user information, the expression of the user, the movement of the eyes of the user, the biological information of the user, and the like can be applied. Examples of the biological information of the user include the heart rate, blood pressure, respiratory rate, brain wave, body temperature, size of a pupil, and the like of the user.

The attention level map creation unit 22 creates an attention level map representing the attention level of the user for each local area of the space on the basis of the space information and the user information. The attention level map creation unit 22 provides the attention level map to the proposing unit 26. That is, the attention level map creation unit 22 associates the space information with the user information and maps the user information to the space information.

The goodness-of-fit map creation unit 24 creates a goodness-of-fit map representing the goodness-of-fit of the object for each local area on the basis of the object information and the space information. The goodness-of-fit map creation unit 24 provides the goodness-of-fit map to the proposing unit 26. That is, the goodness-of-fit map creation unit 24 associates the space information with the object information and maps the object information to the space information.

The proposing unit 26 proposes the disposition of object in the space on the basis of the attention level map and the goodness-of-fit map. That is, the proposing unit 26 searches for a local area suitable for disposing the object by using the attention level map and the goodness-of-fit map. The proposing unit 26 may map a score representing a degree of goodness-of-fit of the disposition of object to the space.

The proposing unit 26 may score the degree of goodness-of-fit of the disposition of the object on the basis of information such as a height of the line of sight of the user, a color of the surroundings, and light for a local area that is a candidate for the disposition of the object.

The proposing unit 26 may apply a score for each local area that is a candidate for the disposition of the object as a proposal for the layout of the object in the space. The proposing unit 26 may specify an optimum disposition of the object and generate a layout image in which the object is disposed in the space. It should be noted that the term "image" in the present specification may include the meaning of image data.

The information processing apparatus 10 can transmit a display signal representing an object layout proposal in the space generated by using the proposing unit 26 to the user terminal. The user terminal can display the object layout proposal in the space by using the display apparatus provided in the user terminal on the basis of the display signal representing the object layout proposal in the space.

Although FIG. 1 shows an aspect in which each unit constituting the information processing apparatus 10 is communicatively connected via the bus 28, at least a part of each unit of the information processing apparatus 10 may be connected via a communication line such as a network.

[Hardware Configuration of Control Apparatus]
<Overall Configuration>

Figure 2:
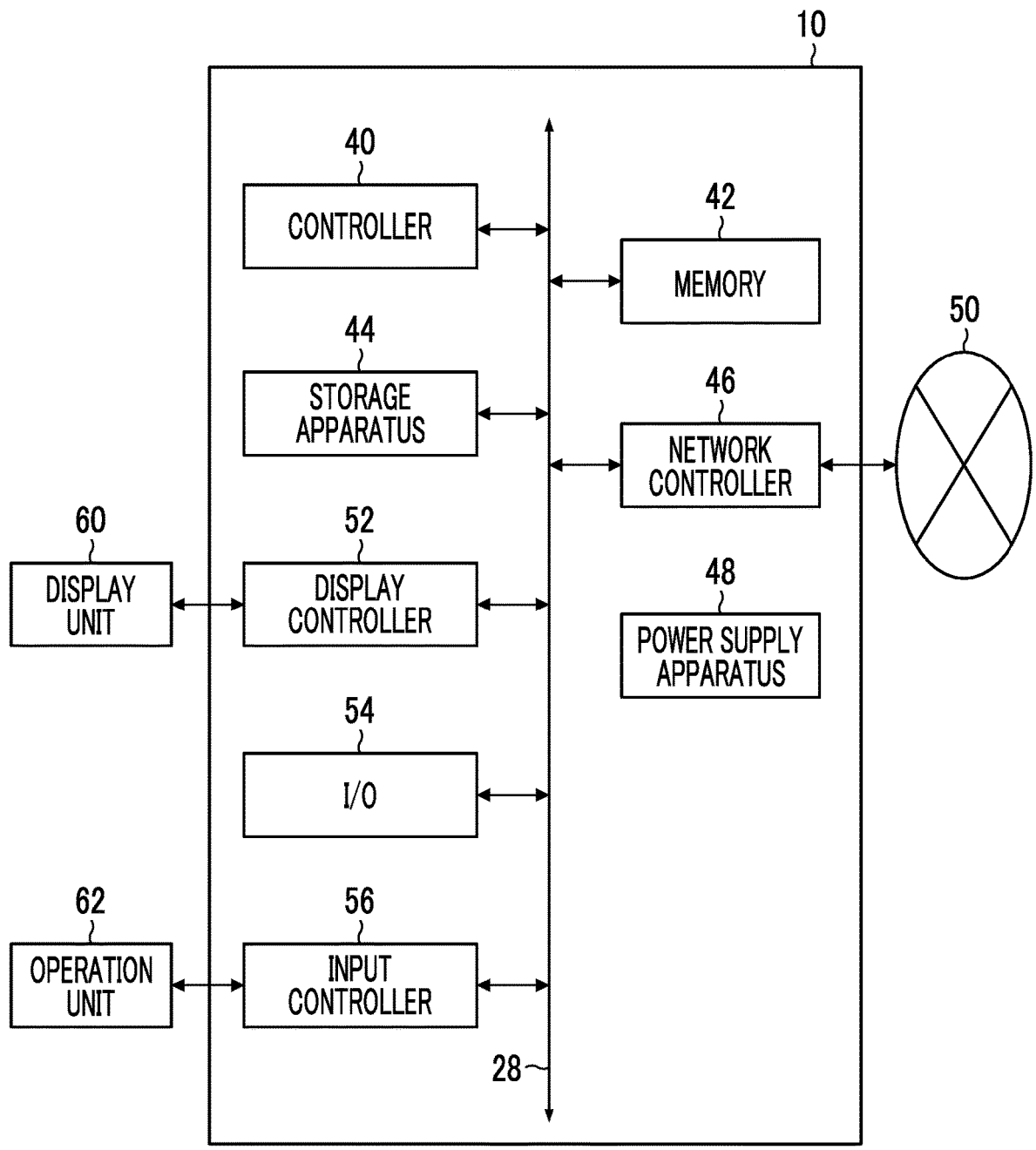
FIG. 2 is a block diagram showing a hardware configuration of an information processing apparatus.

FIG. 2 is a block diagram showing a hardware configuration of an information processing apparatus. The information processing apparatus 10 shown in FIG. 1 comprises a controller 40, a memory 42, a storage apparatus 44, a network controller 46, and a power supply apparatus 48. The controller 40, the memory 42, the storage apparatus 44, and the network controller 46 are communicably connected via the bus 28.

The information processing apparatus 10 may comprise a display controller 52, an input and output interface 54, and an input controller 56. The information processing apparatus 10 can execute a prescribed program by using the controller 40 to realize various functions of the information processing apparatus 10.

<Controller>

The controller 40 functions as an overall controller, various calculation units, and a storage controller of the information processing apparatus 10. The controller 40 executes a program stored in a read only memory (ROM) included in the memory 42.

The controller 40 may download the program from an external memory apparatus via the network controller 46 and execute the downloaded program. The external memory apparatus may be communicably connected to the information processing apparatus 10 via the network 50.

The controller 40 uses a random access memory (RAM) provided in the memory 42 as a calculation area, and executes various processing in cooperation with various programs. As a result, various functions of the information processing apparatus 10 are realized.

The controller 40 controls reading data from the storage apparatus 44 and writing data to the storage apparatus 44. The controller 40 may acquire various data from the external memory apparatus via the network controller 46. The controller 40 can execute various processing such as calculations by using the acquired various data.

The controller 40 may include one or more processors. Examples of processors include a field programmable gate array (FPGA) and a programmable logic device (PLD). FPGA and PLD are devices whose circuit configurations can be changed after manufacturing.

Another example of a processor is an application specific integrated circuit (ASIC). The ASIC comprises a circuit configuration specifically designed to execute a specific processing.

The controller 40 can apply two or more processors of the same type. For example, the controller 40 may use two or more FPGAs or two PLDs. The controller 40 may apply two or more processors of different types. For example, the controller 40 may apply one or more FPGAs and one or more ASICs.

In a case where the plurality of controllers 40 are comprised, the plurality of controllers 40 may be configured by using one processor. As an example of configuring the plurality of controllers 40 by one processor, there is an aspect in which one processor is configured by using a combination of one or more central processing units (CPU) and software, and this processor functions as the plurality of controllers 40. It should be noted that the software in the present specification is synonymous with a program.

A graphics processing unit (GPU), which is a processor specialized in image processing, may be applied instead of or in combination with the CPU. A computer is a typical example in which a plurality of controllers 40 are configured by using one processor.

As another example of configuring the plurality of controllers 40 by one processor, an aspect using a processor for realizing the functions of the entire system including the plurality of controllers 40 by one IC chip is included. A system on chip (SoC) is a typical example of the processor for realizing the functions of the entire system including a plurality of controllers 40 by one IC chip. It should be noted that IC is an abbreviation for an integrated circuit.

As such, the controller 40 is configured by using one or more of the various processors as a hardware structure.

<Memory>

The memory 42 comprises a ROM (not shown) and a RAM (not shown). The ROM stores various programs executed in the information processing apparatus 10. The ROM stores parameters, files, and the like used for executing various programs. The RAM functions as a temporary storage area for data, a work area for the controller 40, and the like.

<Storage Apparatus>

The storage apparatus 44 stores various data non-temporarily. The storage apparatus 44 may be externally attached to the information processing apparatus 10. A large-capacity semiconductor memory apparatus may be applied instead of or in combination with the storage apparatus 44.

<Network Controller>

The network controller 46 controls data communication with an external apparatus. Control of data communication may include management of data communication traffic. A known network such as a local area network (LAN) may be applied to the network 50 connected via the network controller 46.

<Power Supply Apparatus>

A large-capacity power supply apparatus such as an uninterruptible power supply (UPS) is applied to the power supply apparatus 48. The power supply apparatus 48 supplies power to the information processing apparatus 10 in a case where the commercial power supply is cut off due to a power failure or the like.

<Display Controller>

The display controller 52 functions as a display driver that controls the display unit 60 on the basis of a command signal transmitted from the controller 40. The display controller 52 shown in the embodiment is an example of a signal transmission unit.

<Input and Output Interface>

The input and output interface 54 is communicably connected between the information processing apparatus 10 and an external device. The input and output interface 54 may apply a communication standard such as a universal serial bus (USB).

<Input Controller>

The input controller 56 converts a format of a signal input by using the operation unit 62 into a format suitable for processing by the information processing apparatus 10. Information input from the operation unit 62 via the input controller 56 is transmitted to each unit via the controller 40.

It should be noted that the hardware configuration of the information processing apparatus 10 shown in FIG. 2 is an example, and can be added, deleted, and changed as appropriate.

[Automatic Layout Proposal for Object]

Next, an automatic layout proposal of an object, which is performed by using the information processing apparatus 10 and is personalized to the user will be explained. In the automatic layout proposal of the object shown in the present embodiment, the automatic layout proposal in a case of decorating a room with an image put in a frame is performed.

[Explanation of Object]

Figure 3:
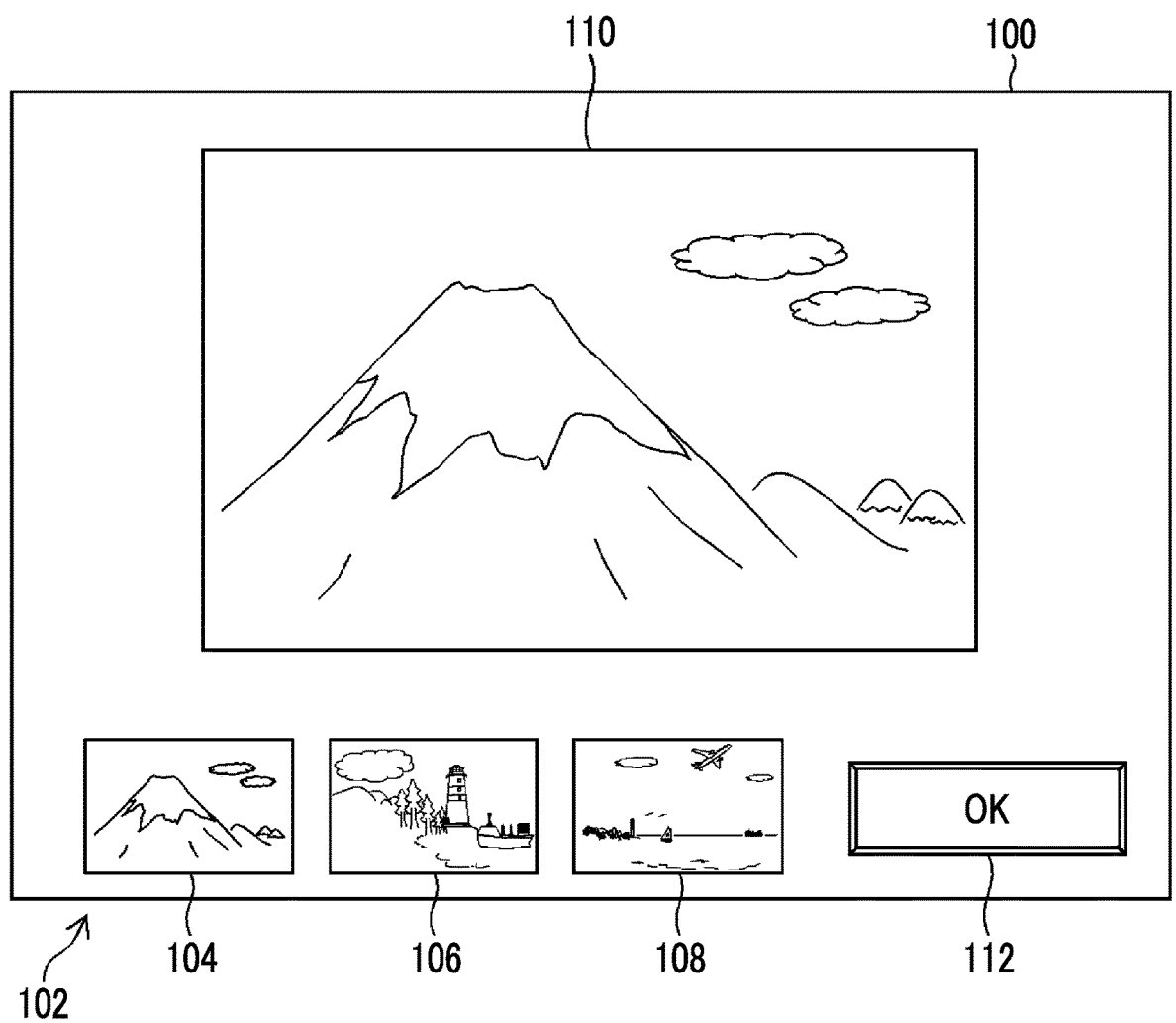
FIG. 3 is an explanatory diagram of an object selection screen.
Figure 4:
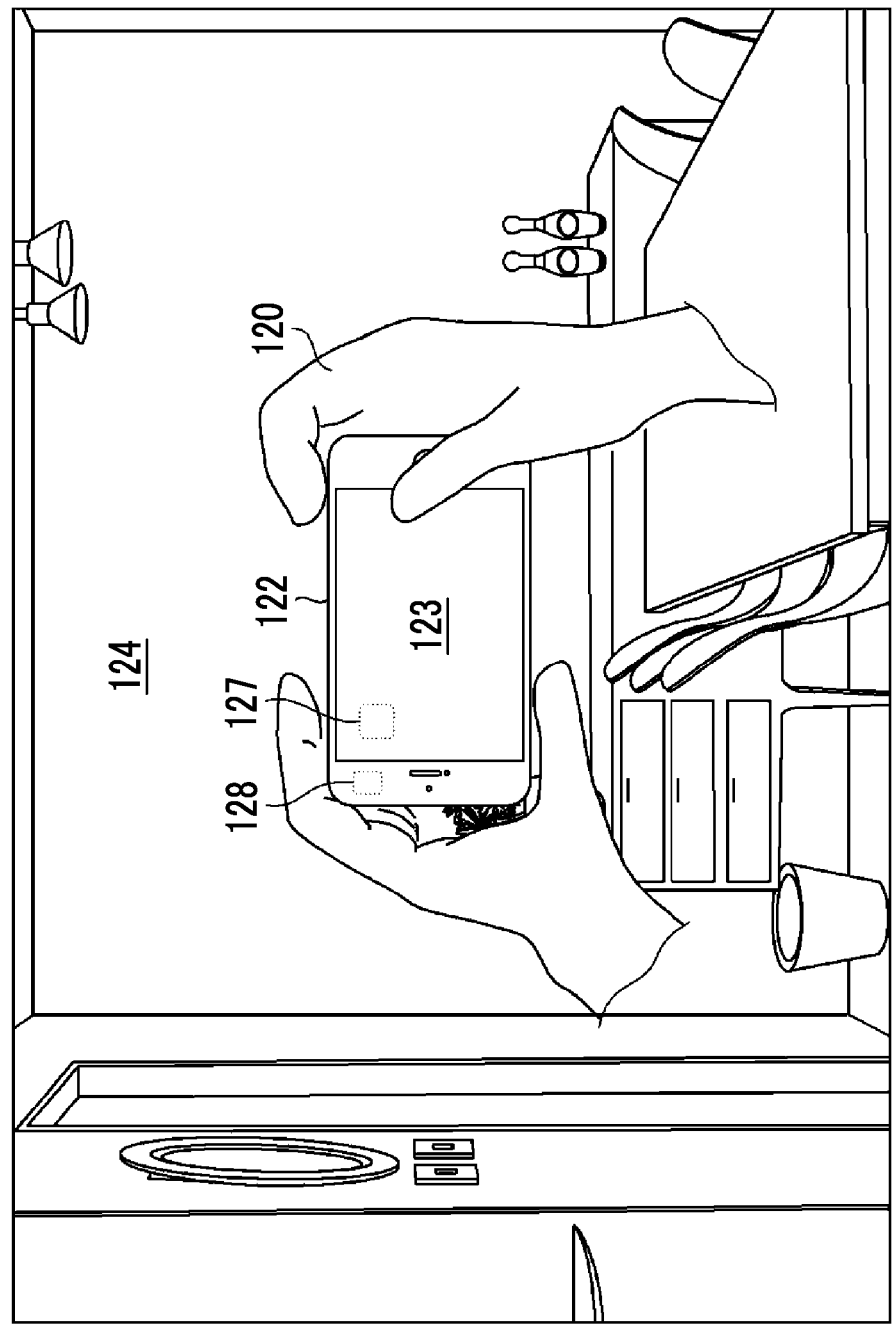
FIG. 4 is a schematic diagram of space sensing and user sensing.

FIG. 3 is an explanatory diagram of an object selection screen. An object selection screen 100 shown in FIG. 3 is displayed using the display apparatus of the user terminal in a case where the user selects an object to be disposed in the space. It should be noted that the user terminal is shown as a smart device 122 in FIG. 4. In addition, the display apparatus of the user terminal is shown in FIG. 4 as a display apparatus 123 of the smart device 122.

The user uses the user terminal to access a site that selects an object. The user opens a page of an object list 102 on which a plurality of objects are posted, and causes the display apparatus of the user terminal to display the object list 102.

In the object list 102 shown in FIG. 3, the first image 104 representing the first object, the second image 106 representing the second object, and the third image 108 representing the third object are displayed. The first image 104, the second image 106, and the third image 108 are applied with thumbnail pictures representing photographs placed in a frame (not shown).

In a case where the user selects a desired object from the object list 102, an image representing the desired object is enlarged and displayed. FIG. 3 shows an example in which an enlarged image 110 of the first image 104 is displayed as a result of selecting the first object. In a case where the user taps an OK button 112, the object selection is confirmed.

The object information acquisition unit 12 shown in FIG. 1 acquires identification information of an object selected by using the user terminal from the user terminal. The object information acquisition unit 12 acquires the object information of the object corresponding to the identification information.

The object information acquisition unit 12 can acquire object information from an object database 34 in which object identification information is associated with object information and stored. Object information is stored in an object information storage unit (not shown).

[Explanation of Space Information]

FIG. 4 is a schematic diagram of space sensing and user sensing. FIG. 4 shows a state in which the user 120 uses the first camera 127 provided in the smart device 122 to capture a video of the inside 124 of the room.

That is, the user 120 scans the first camera 127 of the smart device 122 to capture the entire video image of the inside 124 of the room. A still image may be captured as the imaging of the inside 124 of the room. In a case where the still image is captured, the user 120 moves an optical axis of the first camera 127 of the smart device 122 to capture a plurality of still images. The imaging of the inside 124 of the room using the first camera 127 of the smart device 122 shown in the embodiment is an example of space sensing.

The smart device 122 transmits the image data of the inside 124 of the room to the information processing apparatus 10 shown in FIG. 1. The space information acquisition unit 14 acquires the image data of the inside 124 of the room as the space sensing information. The space information acquisition unit 14 may analyze the image data of the inside 124 of the room to acquire information such as a size of the room, a color of a wall of the room, a size of a furniture such as a table, a color of the furniture, a size of ornaments, and a color of the ornaments.

Known techniques can be applied to the analysis of the image data. The information processing apparatus 10 may comprise a space sensing information analysis unit that analyzes the space sensing information acquired from the space sensor 30.

Figure 5:
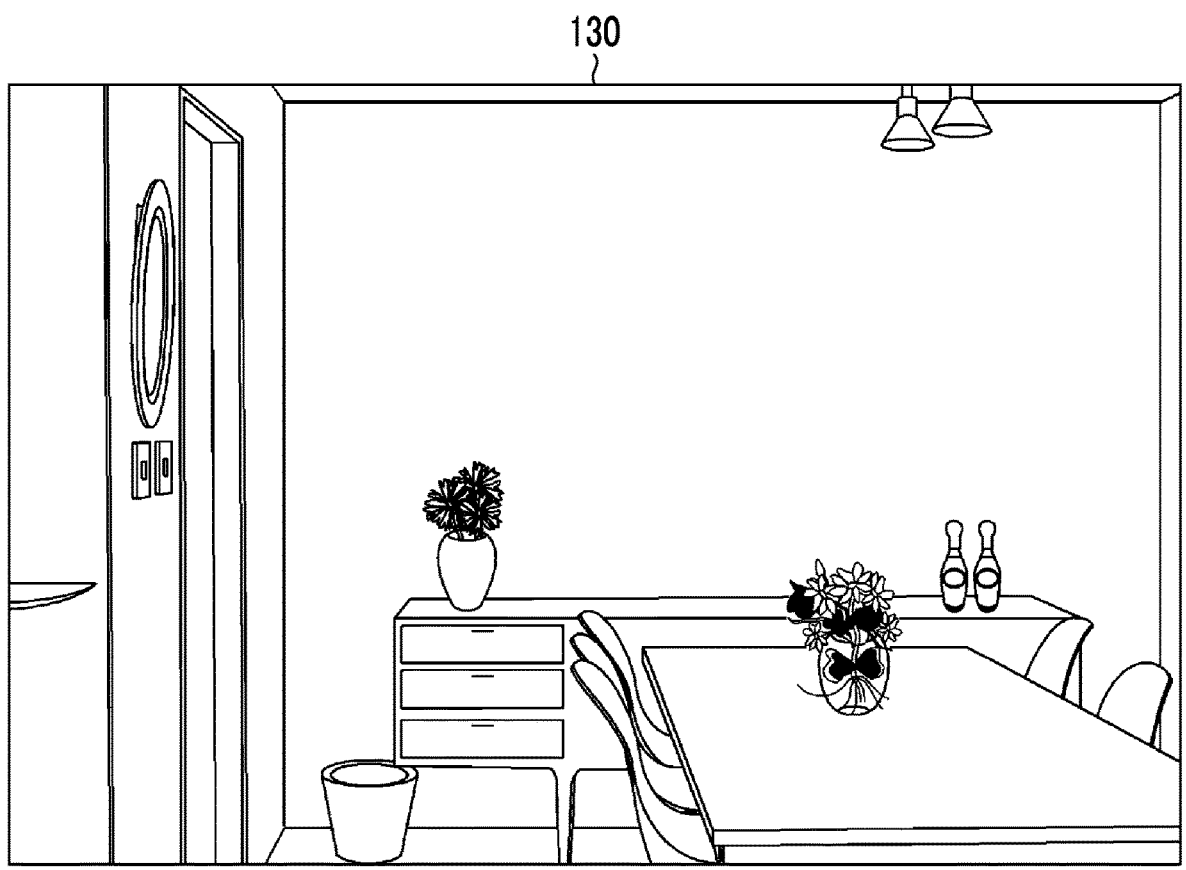
FIG. 5 is an explanatory diagram showing an example of space information.

FIG. 5 is an explanatory diagram showing an example of space information. The space information 130 shown in FIG. 5 has one frame included in the video of the inside 124 of the room shown in FIG. 4 as a constitutional element. The space information 130 may include information on the inside 124 of the room as a constitutional element, such as the size of the room, the color of the wall of the room, the size of furniture such as tables, the color of the furniture, the size of ornaments, and the color of ornaments as a constitutional element.

[Explanation of User Information]

Returning to FIG. 4, the user 120 images the user 120 by using the second camera 128 provided in the smart device 122 in a case of capturing the video of the inside 124 of the room. The user 120 applies an angle of view including the face of the user 120 to image the user 120.

The smart device 122 transmits the image data of the user 120 to the information processing apparatus 10. The user information acquisition unit 18 acquires the image data of the user 120 as the user sensing information. The image data of the user 120 may include the eyes of the user 120 among the faces of the user 120. The imaging of the user 120 using the second camera 128 of the smart device 122 shown in the embodiment is an example of user sensing.

The user information acquisition unit 18 may analyze the image data of the user 120, and acquire information on the state of the user 120 such as an expression, a change in the expression, a line of sight, and a size of the pupil of the user 120 as a constitutional element of the user information. An example of the change of the expression of the user 120 is a case where the expression of the user 120 changes from a normal expression to an expression showing a favorable expression.

Known techniques can be applied to the analysis of the image data of the user 120. The information processing apparatus 10 may comprise a user sensing information analysis unit that analyzes the user sensing information acquired from the user sensor 32.

[Explanation of Attention Level Map]

Figure 6:
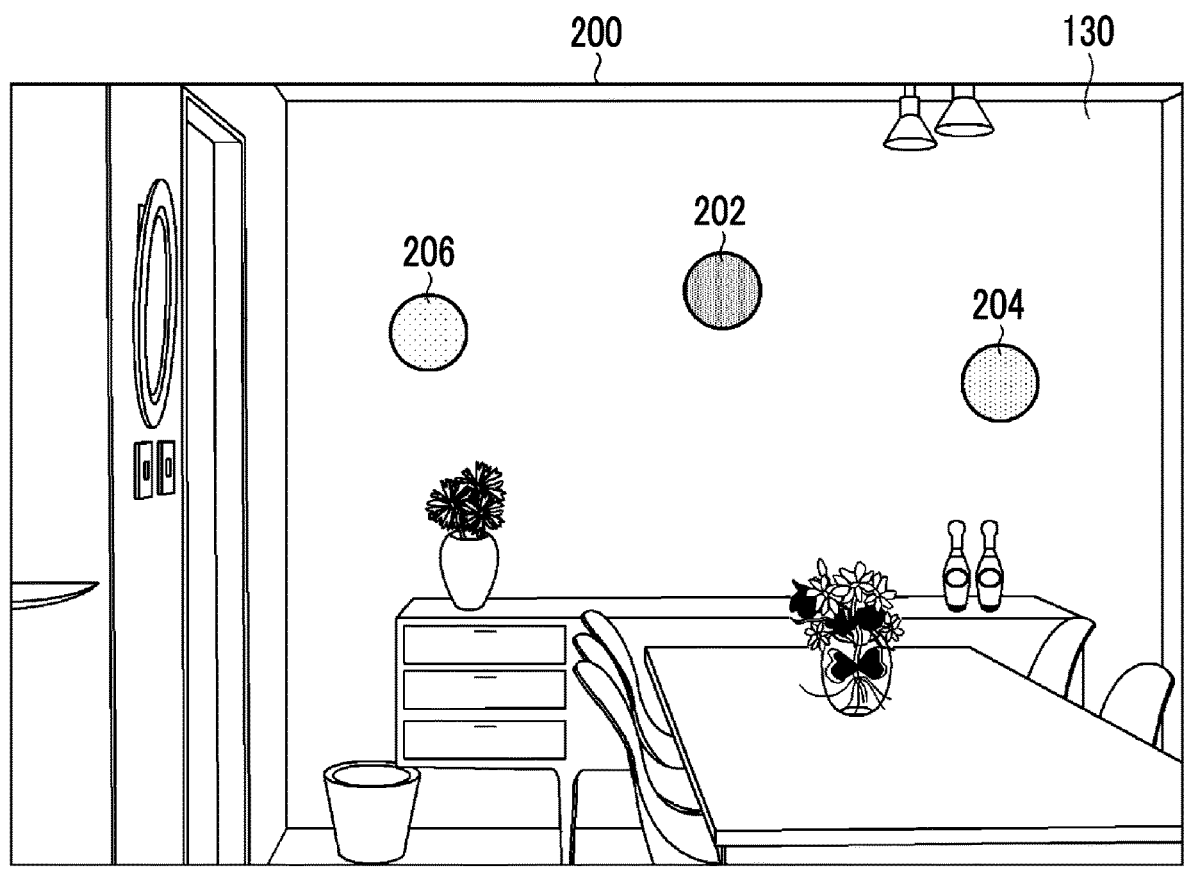
FIG. 6 is a schematic diagram of an attention level map.

FIG. 6 is a schematic diagram of an attention level map. In an attention level map 200 shown in FIG. 6, an attention level score 202 or the like representing the attention level of the user generated from the user information is mapped to the space information 130.

That is, the attention level map creation unit 22 shown in FIG. 1 generates the attention level score 202, an attention level score 204, and an attention level score 206 representing the attention level of the user from the user information, and generates the attention level map 200 in which the attention level score 202, the attention level score 204, and the attention level score 206 are mapped to the space information 130.

In the attention level map 200 shown in FIG. 6, the attention level score 202 representing the highest score is mapped to a local area that the user 120 has paid most attention to. That is, in the attention level map 200, in a case where the user 120 images the space, the attention level score 202 representing the highest score is mapped to the local area where the user has the most favorable expression.

In the attention level map 200, the attention level score 204 representing the second highest score is mapped to the local area where the user 120 has paid attention to second, and the attention level score 206 representing the third score is mapped to the local area where the user 120 has paid attention to third. That is, in the attention level map 200, the attention level score 202 and the like generated in the order of the degree of attention of the user grasped from the expression of the user 120 are mapped to the space information 130.

The attention level score 202 or the like may use a numerical value to represent the size of the attention level of the user, or may use a color to represent the size of the attention level of the user. The color referred to here may include at least one of hue, brightness, or saturation. The same applies to the goodness-of-fit map described later. For the attention level score 202 and the like, a symbol mark and a numerical value may be written together. A known image analysis method can be applied as a method for analyzing the degree of attention of the user from the expression of the user.

In the present embodiment, an aspect in which a plurality of attention level scores are mapped to the space information 130 is shown, but the attention level scores mapped to the space information 130 may be one or more. In addition, four or more attention level scores may be mapped to the space information 130.

[Explanation of Goodness-of-Fit Map]

Figure 7:
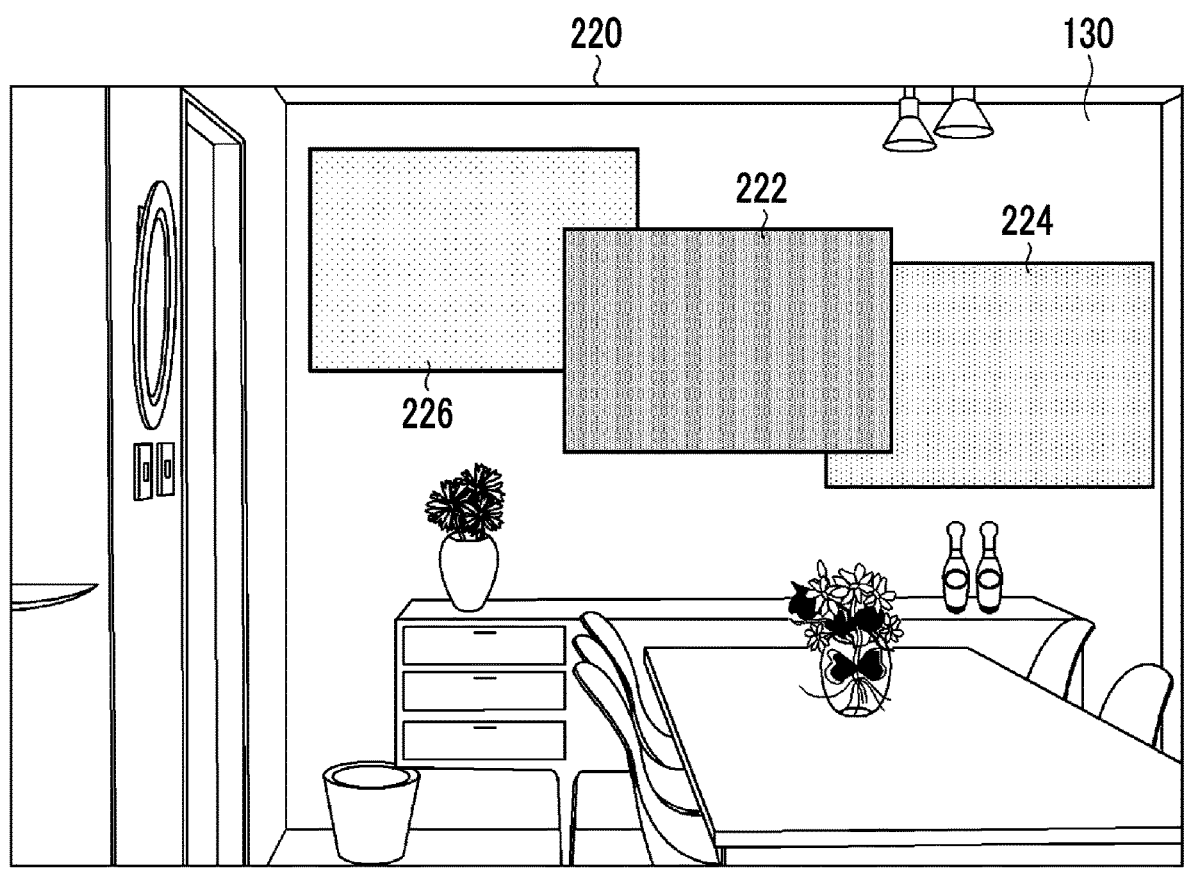
FIG. 7 is a schematic diagram of a goodness-of-fit map.

FIG. 7 is a schematic diagram of a goodness-of-fit map. In a goodness-of-fit map 220 shown in FIG. 7, a goodness-of-fit score 222 or the like representing the goodness-of-fit as a local area in which an object is disposed is mapped to the space information 130.

That is, the goodness-of-fit map creation unit 24 shown in FIG. 1 generates, from the object information and the space information, the goodness-of-fit score 222, a goodness-of-fit score 224, and a goodness-of-fit score 226 representing goodness-of-fit as a local area in which the object is disposed, and generates the goodness-of-fit map 220 in which the goodness-of-fit score 222, the goodness-of-fit score 224, and the goodness-of-fit score 226 are mapped to the space information 130.

In other words, by comprehensively considering conditions such as the position, size, color, and light of the space, and conditions such as the type, shape, size, and color of the object, the degree of goodness-of-fit between the local area of the space and the object is scored, and the goodness-of-fit score 222 or the like is generated.

For example, in a center of space, a high score is given to objects such as a table suitable for the center of space. In addition, in the center of the space, a high score is given to objects such as tables with a large size. In a wall, a high score is given to objects such as paintings suitable for the wall. In a floor, a high score is given to objects such as a carpet suitable for the floor.

In the goodness-of-fit map 220, the goodness-of-fit score 222 representing the highest score is mapped to the local area that is the most suitable for the disposition of the object. In the goodness-of-fit map 220, the goodness-of-fit score 224 representing the second highest score is mapped to the local area that is the second most suitable for the disposition of the object, and the goodness-of-fit score 226 representing the third highest score is mapped to the local area that is the third best suitable for the disposition of the object.

That is, in the goodness-of-fit map 220, on the basis of the space information 130 and the object information, the goodness-of-fit score 222 or the like representing the order suitable for the disposition of the objects is mapped to the space information 130.

For the goodness-of-fit score 222 or the like, a numerical value may be used to represent the degree of the goodness-of-fit of the disposition of the object, or a color may be used to represent the degree of the goodness-of-fit of the disposition of the object. For the goodness-of-fit score 222 or the like, a symbol mark and a numerical value may be written together.

In the present embodiment, an aspect in which a plurality of goodness-of-fit scores are mapped to the space information 130 is shown, but the goodness-of-fit score mapped to the space information 130 may be one or more. In addition, four or more goodness-of-fit scores may be mapped to the space information 130.

[Explanation of Object Layout Proposal]

Figure 8:
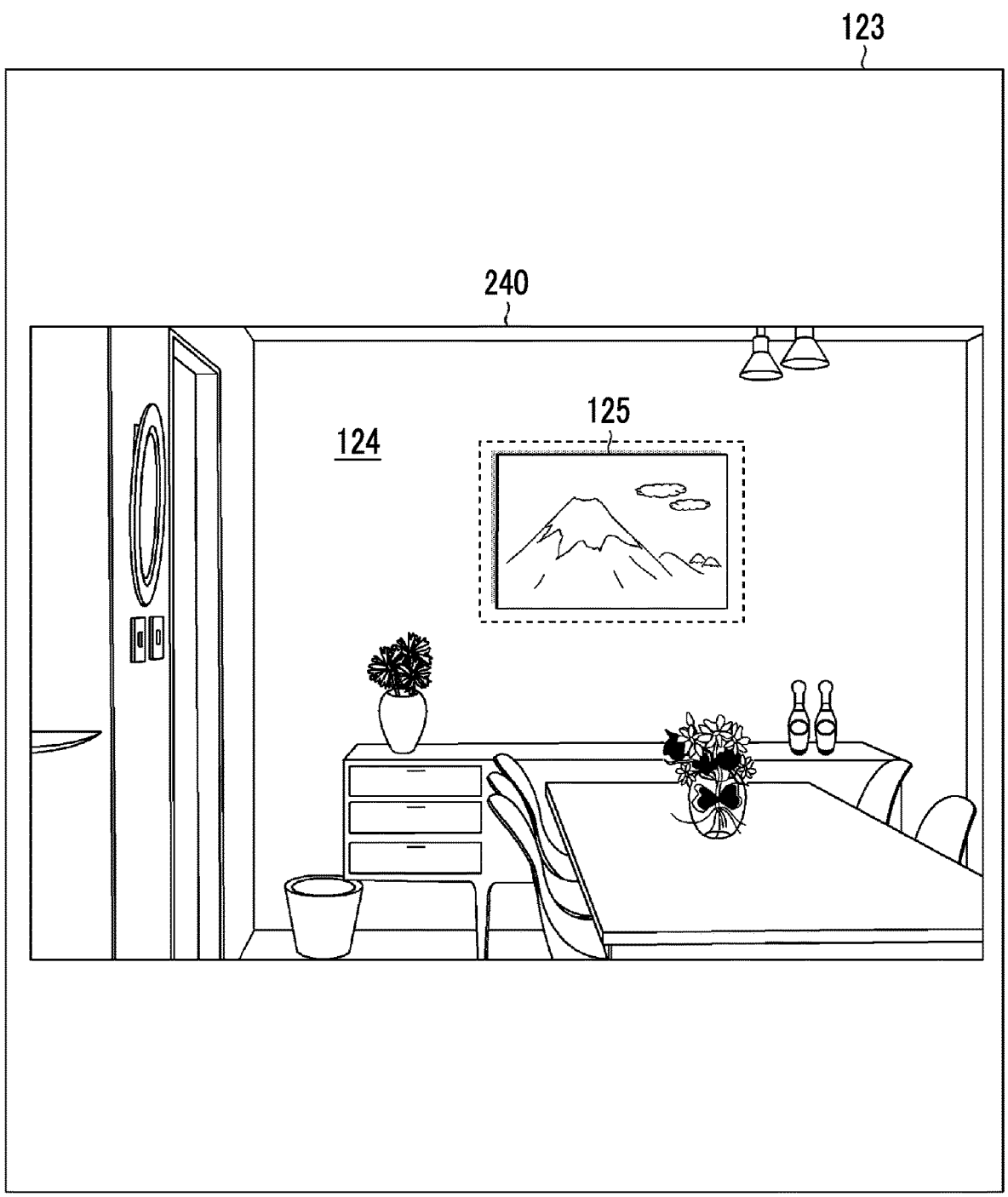
FIG. 8 is a schematic diagram of a layout proposal.

FIG. 8 is a schematic diagram of a layout proposal. The proposing unit 26 shown in FIG. 1 generates a layout image 240 shown in FIG. 8. The information processing apparatus 10 transmits a display signal representing the layout image 240 to the smart device 122.

The user 120 can see the layout image 240 displayed on the display apparatus 123 of the smart device 122 and confirm the layout proposal of the optimum object 125 personalized to the user.

In the present embodiment, the display signal representing the layout image 240 is transmitted from the information processing apparatus 10 to the smart device 122, but the information processing apparatus 10 may transmit the image data representing the layout image 240 to a printer (not shown). The user 120 can see an image printed by the printer and confirm the layout proposal of the optimum object 125 personalized by the user. The printer shown in the embodiment is an example of a printing apparatus.

[Flowchart of Information Processing Method]

Figure 9:
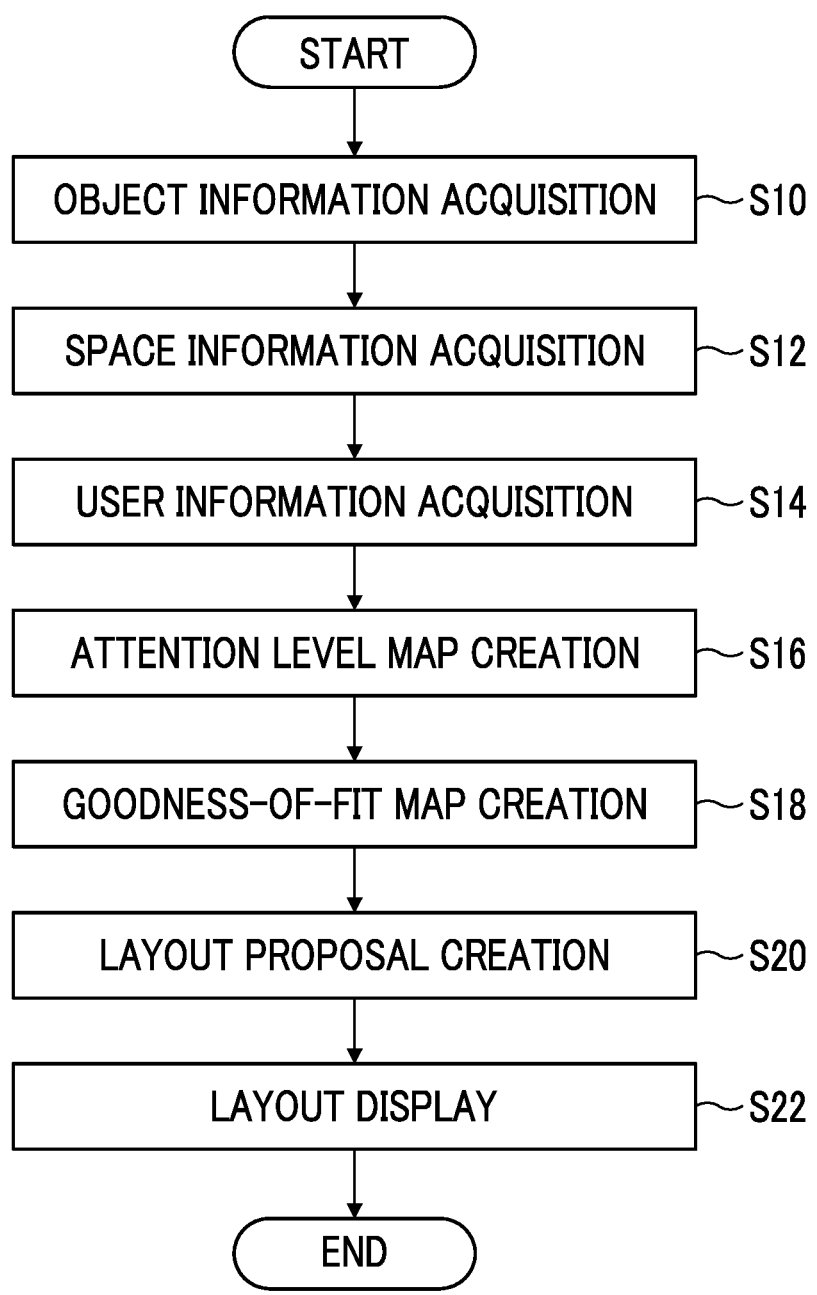
FIG. 9 is a flowchart showing a procedure of an information processing method.

FIG. 9 is a flowchart showing a procedure of an information processing method. The information processing method showing the procedure in FIG. 9 includes an object information acquisition step S10, a space information acquisition step S12, a user information acquisition step S14, an attention level map creation step S16, a goodness-of-fit map creation step S18, a layout proposal creation step S20, and a display step S22. It should be noted that in the flowchart shown in FIG. 9, a printing step may be added, or a printing step may be performed instead of the display step S22.

In the object information acquisition step S10, the object information acquisition unit 12 shown in FIG. 1 specifies an object on the basis of selection information of the object, and acquires the object information from the object database 34 on the basis of identification information of the object. The object information acquisition unit 12 stores the object information in the space information storage unit 16. After the object information acquisition step S10, the process proceeds to the space information acquisition step S12.

In the space information acquisition step S12, the space information acquisition unit 14 acquires space sensing information from the space sensor 30. The space information acquisition unit 14 analyzes the space sensing information and derives the space information 130. The space information acquisition unit 14 stores the space information 130 in the space information storage unit 16. After the space information acquisition step S12, the process proceeds to the user information acquisition step S14.

In the user information acquisition step S14, the user information acquisition unit 18 acquires user sensing information from the user sensor 32. The space information acquisition unit 14 analyzes the user sensing information and derives the user information. The user information acquisition unit 18 stores user information in the user information storage unit 20. After the user information acquisition step S14, the process proceeds to the attention level map creation step S16.

It should be noted that the object information acquisition step S10, the space information acquisition step S12, and the user information acquisition step S14 may be performed in parallel, or in a different order. That is, the space information 130 and the user information may be acquired before the attention level map creation step S16 is performed. In addition, the space information 130 and the object information may be acquired before the goodness-of-fit map creation step S18 is performed.

In the attention level map creation step S16, the attention level map creation unit 22 creates the attention level map 200 shown in FIG. 6 on the basis of the space information 130 and the user information. After the attention level map creation step S16, the process proceeds to the goodness-of-fit map creation step S18.

In the goodness-of-fit map creation step S18, the goodness-of-fit map creation unit 24 creates the goodness-of-fit map 220 shown in FIG. 7 on the basis of the object information and the space information 130. After the goodness-of-fit map creation step S18, the process proceeds to the layout proposal creation step S20.

It should be noted that the attention level map creation step S16 and the goodness-of-fit map creation step S18 may be performed in parallel, or in a different order. That is, the attention level map 200 and the goodness-of-fit map 220 may be generated before the layout proposal creation step S20 is performed.

In the layout proposal creation step S20, the proposing unit 26 generates the layout image 240 shown in FIG. 8 on the basis of the attention level map 200 and the goodness-of-fit map 220. After the layout proposal creation step S20, the process proceeds to the display step S22. The layout proposal creation step S20 shown in the embodiment is an example of a proposing step.

In the display step S22, the information processing apparatus 10 generates a display signal representing the layout image 240 on the smart device 122. The user can see the layout image 240 displayed on the display apparatus 123 and confirm the layout of the object generated by the information processing apparatus 10. In the display step S22, the information processing apparatus 10 may transmit image data representing the layout image 240 to a printer (not shown). After the display step S22, the information processing apparatus 10 ends the information processing method.

[Action and Effect]

According to the information processing apparatus and the information processing method shown in the present embodiment, the following action and effect can be obtained.

[1]

On the basis of the space information and the user information, the attention level map 200 showing a degree of attention of the user 120 for each local area in the inside 124 of the room is generated. Thereby, in a case where the user 120 senses the inside 124 of the room, it is possible to grasp which local area and how much the user pays attention to. In addition, on the basis of the object information and the space information, the goodness-of-fit map 220 showing the degree of goodness-of-fit of the disposition of the objects 125 for each local area of the inside 124 of the room is created. This makes it possible to grasp which local area of the inside 124 of the room is suitable for the disposition of the object 125. Further, on the basis of the attention level map 200 and the goodness-of-fit map 220, the layout of the object 125 in the inside 124 of the room is proposed. This makes it possible to propose the optimal layout of the object 125, which is personalized to the user 120.

[2]

The proposing unit 26 generates the layout image 240 representing the optimal layout of the object 125 in the inside 124 of the room, personalized to the user 120. The information processing apparatus 10 transmits a display signal representing the layout image 240 to the smart device 122. As a result, the layout image 240 can be displayed on the display apparatus 123 of the smart device 122.

[3]

User 120 selects an object from the object list 102. The object information acquisition unit 12 specifies an object using the identification information of the object, accesses the object database 34, and acquires the object information. As a result, the information processing apparatus 10 can acquire the object information corresponding to the object selected by the user.

[4]

The user 120 uses the first camera 127 of the smart device 122 to acquire imaging data of the inside 124 of the room. As a result, the imaging data of the inside 124 of the room can be applied as a constitutional element of the space information.

[5]

The space information acquisition unit 14 acquires at least any information of a size and color of the inside 124 of the room, a size of a furniture and the like to be disposed, or a color of the furniture and the like. Thereby, a color such as the size of the inside 124 of the room can be applied as a constitutional element of the space information.

[6]

The user 120 acquires the imaging data of the user by using the second camera 128 of the smart device 122. The user information acquisition unit 18 acquires at least any information of an expression, a change in the expression, a line of sight, or a size of the pupil of the user 120 from the imaging data of the user 120. As a result, the expression of the user 120 or the like can be applied as a constitutional element of the user information.

[Modification Example]

[Modification Example of Attention Level Map Creation]

Next, a modification example of creating the attention level map will be explained. The attention level map creation unit 22 can generate a favorability map representing a degree of the favorability of the user with respect to the space as an attention level map by applying a recognizer that has learned a relationship between an expression and a favorability of the user. The favorability of the user is an example of the condition of the user.

For learning, a convolutional neural network can be applied. It should be noted that the convolutional neural network may be called CNN by using the abbreviation of convolutional neural network written in English.

Figure 10:
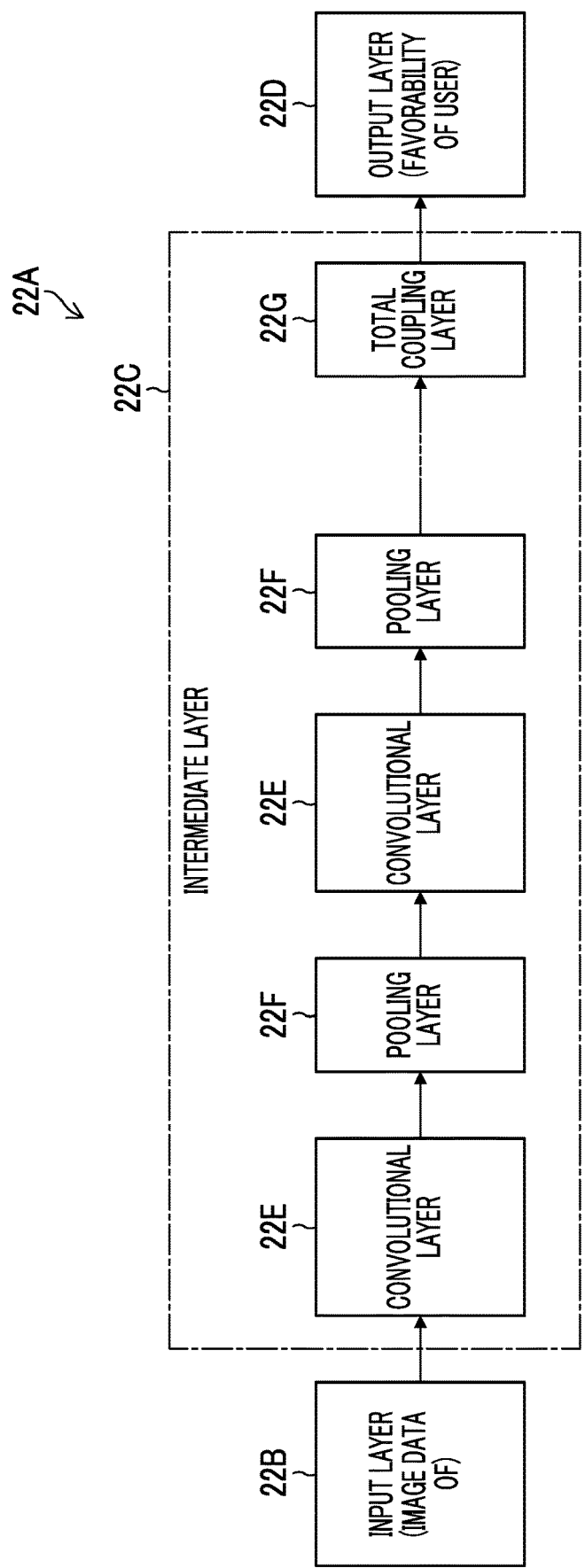
FIG. 10 is an explanatory diagram of a convolutional neural network.

FIG. 10 is an explanatory diagram of a convolutional neural network. An attention level map creation unit 22A comprises an input layer 22B, an intermediate layer 22C, and an output layer 22D. The intermediate layer 22C comprises a plurality of sets composed of a convolutional layer 22E and a pooling layer 22F, and a total coupling layer 22G. Each layer has a structure in which a plurality of nodes are connected using edges.

The image data of the user who is a target of recognition processing is input to the input layer 22B. The intermediate layer 22C has a plurality of sets including the convolutional layer 22E and the pooling layer 22F as one set, and the total coupling layer 22G, and extracts features from the image data input from the input layer 22B.

The convolutional layer 22E acquires a feature map by filter processing nearby nodes in the previous layer. The convolutional layer 22E performs a convolutional calculation using a filter as filter processing.

The pooling layer 22F reduces the feature map output from the convolutional layer 22E into a new feature map. The convolutional layer 22E plays a role of feature extraction such as edge extraction from the image data. The pooling layer 22F plays a role of giving robustness such that the extracted feature are not affected by parallel translation or the like.

The intermediate layer 22C is not limited to the case including the convolutional layer 22E and the pooling layer 22F as one set, but includes a case in which the convolutional layer 22E is continuous and a case in which a normalization layer (not shown) is comprised. In addition, the weight and bias of the filters used in each convolutional layer 22E are automatically learned in advance using a large number of learning data.

The attention level map creation unit 22A shown in the present modification example learns, as learning data, a combination of either at least one of an expression of the user or a change in the expression of the user, or a favorability of the user. The expression of the user can be derived from a space structure of the face in the image data of the user.

In a case where the image data of the user 120 is input to the input layer 22B, the attention level map creation unit 22A outputs a score representing the degree of the favorability of the user 120 from the output layer 22D through processing in the intermediate layer 22C.

The attention level map creation unit 22A may apply a recognizer that has learned the state of the user 120 in a case of having a positive emotion such as liking. The attention level map creation unit 22A may apply a recognizer that has learned the state of the user 120 in a case of having a negative emotion such as dislike.

[Action and Effect of Modification Example of Attention Level Map Creation]

According to the modification example of the attention level map creation, the attention level map creation unit 22 is applied with a recognizer that has learned the relationship between the expression and favorability of the user. A convolutional neural network is applied to the recognizer. This makes it possible to acquire user information with high robustness and accuracy.

[Modification Example of User Sensing Information Acquisition]

Figure 11:
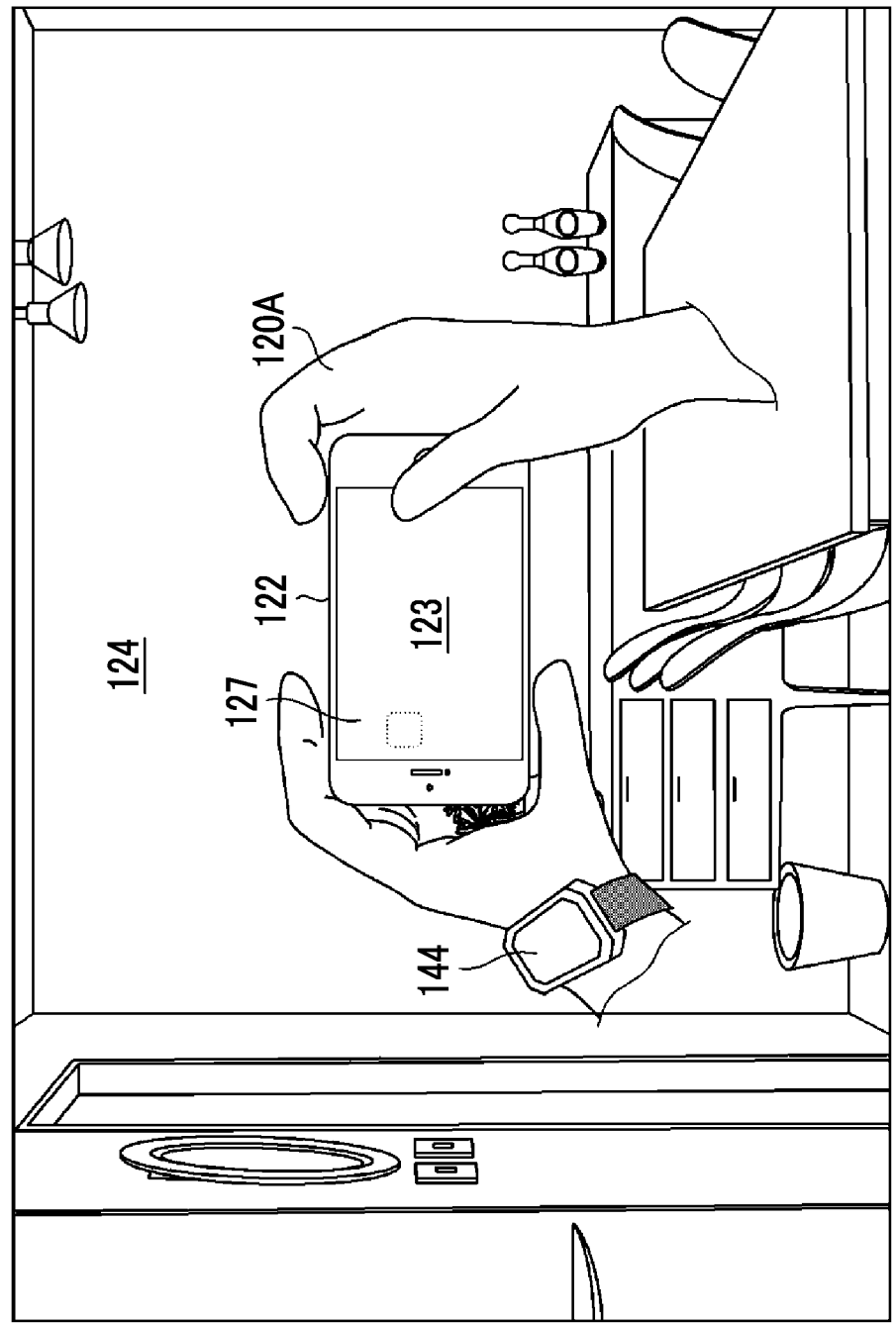
FIG. 11 is an explanatory diagram of a modification example of user sensing information acquisition.

FIG. 11 is an explanatory diagram of a modification example of user sensing information acquisition. The user 120A shown in FIG. 11 uses the first camera 127 of the smart device 122 as the space sensor 30 shown in FIG. 1. In addition, the user 120A uses a heart rate measuring device 144 as the user sensor 32. The heart rate measuring device 144 is a wristwatch type.

That is, the space information acquisition unit 14 shown in FIG. 1 acquires the imaging data of the inside 124 of the room from the first camera 127. The user information acquisition unit 18 acquires information on the heart rate of the user 120A from the heart rate measuring device 144. The user information includes the information on the heart rate of the user 120A.

Although not shown, the user sensor 32 may apply a brain wave measuring unit that can be mounted on the head portion of the user 120A. The user sensor 32 may apply a biological information measuring apparatus for measuring the biological information of the user 120A, such as a sphygmomanometer, a respirator, and a thermometer. It should be noted that the surface temperature of the skin of the user 120A may be applied to the body temperature. A temperature sensor that measures the surface temperature of the skin of the user 120A may be applied to the thermometer. A noncontact temperature sensor may be applied.

In a case where the user information includes a plurality of constitutional elements, the attention level map creation unit 22 may generate an attention level map using the overall attention level of the user 120A by using the plurality of constitutional elements constituting the user information.

An example of a combination of a plurality of constitutional elements includes a combination of appearance information of the user 120A and biological information of the user 120A, such as a combination of the line of sight of the user 120A and the heart rate of the user 120A.

Another example of a combination of a plurality of constitutional elements includes a combination of the appearance information of the user 120A, such as a combination of the expression of the user 120A and the line of sight of the user 120A. The user information may be a combination of biological information of the user 120A.

[Action and Effect of Modification Example of User Sensing Information Acquisition]

According to the modification example of user sensing information acquisition, the following action and effect can be obtained.

<1>

The biological information of the user 120A is applied as a constitutional element of the user information. The biological information of the user 120A reflects the state of the user 120A. As a result, the attention level map 200 based on the biological information of the user 120A is generated.

<2>

The user information acquisition unit 18 acquires a plurality of user sensing information. The user information acquisition unit 18 acquires user information including a plurality of constitutional elements. The attention level map creation unit 22 creates the attention level map 200 by using a plurality of constitutional elements of user information. As a result, the attention level map 200 that reflects the detailed state of the user 120A can be created.

[Modification Example of Layout Proposal]

Figure 12:
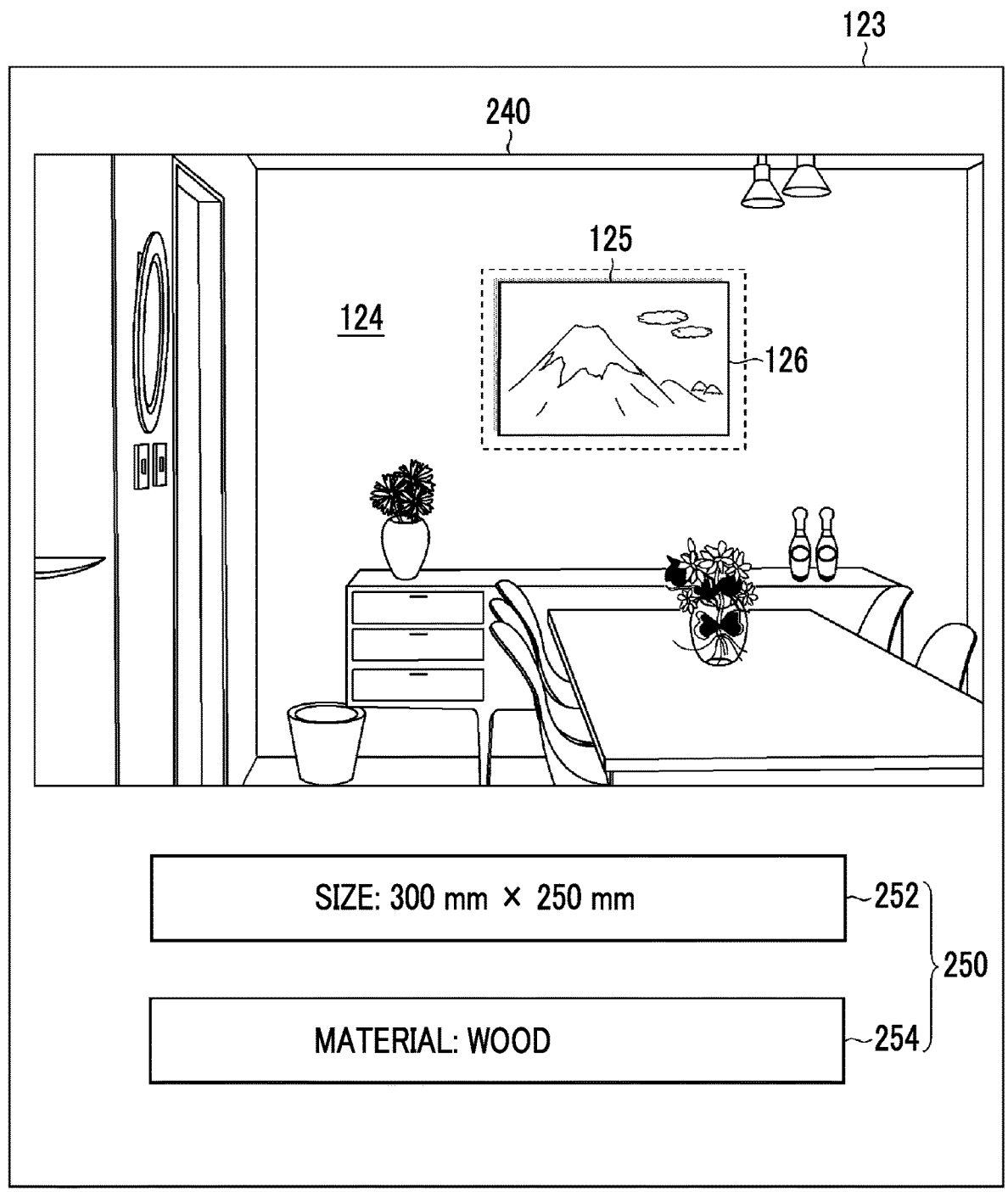
FIG. 12 is an explanatory diagram of a modification example of a layout proposal.

FIG. 12 is an explanatory diagram of a modification example of a layout proposal. The layout proposal shown in FIG. 12 includes the layout image 240 and object information 250. That is, the display apparatus 123 of the smart device 122 displays the layout image 240 and the object information 250.

The object information 250 shown in FIG. 12 includes size information 252 representing the size of the object 125 and material information 254 representing a material of a frame 126 of the object 125.

In FIG. 12, the object information 250 including a plurality of information is exemplified, but the object information 250 may be one. The size information 252 and the material information 254 shown in FIG. 12 are examples, and the object information 250 may include other information such as the mass, price, manufacturer, and seller of the object 125.

[Action and Effect of Modification Example of Layout Proposals]

According to the modification example of the layout proposal, the following action and effect can be obtained.

<1>

The object information 250 is included in the layout proposal. As a result, the user 120 can grasp the real object.

<2>

The object information 250 includes size information 252 representing the size of the object 125. As a result, the user 120 can grasp the size of the object 125.

<3>

The object information 250 includes the material information 254 representing the material of the frame 126 of the object 125. As a result, the user 120 can grasp the material of the frame 126 of the object 125.

[Application Example]

Next, an application example of the above-described embodiment will be explained. In the layout proposal according to the application example, a case where furniture is disposed in the inside 124 of the room will be explained. Hereinafter, a difference from the above-described embodiment will be mainly explained.

[Object Selection]

Figure 13:
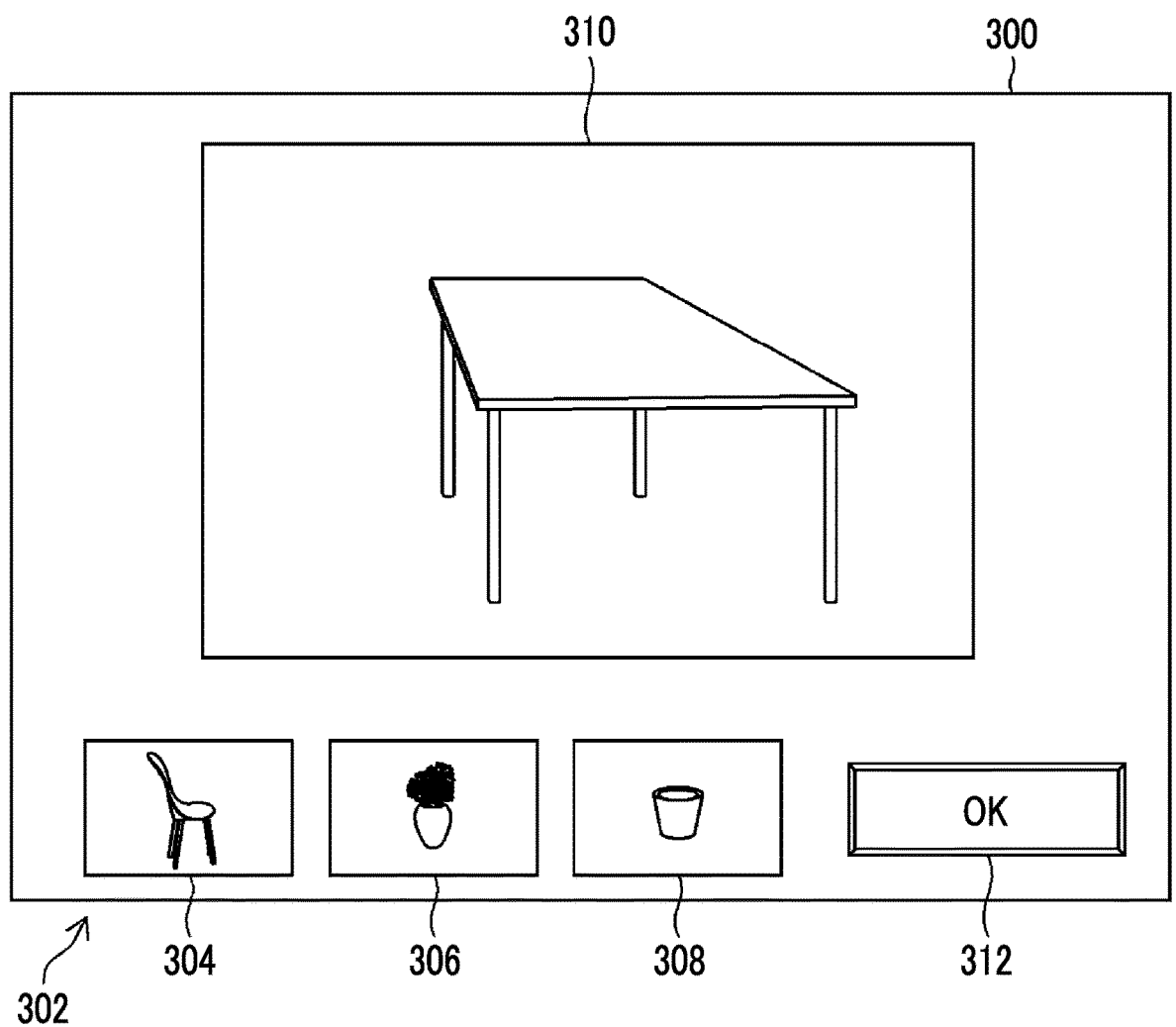
FIG. 13 is an explanatory diagram of an object selection screen according to an application example.

FIG. 13 is an explanatory diagram of an object selection screen according to an application example. In an object selection screen 300 shown in FIG. 13, an object list 302 includes a chair image 304, a vase image 306, and a trash can image 308. The object selection screen 300 shows a state in which the table image 310 is selected. The user 120 can tap the OK button 312 to confirm a table selection of the table image 310 as an object.

[Space Sensing and User Sensing]

Figure 14:
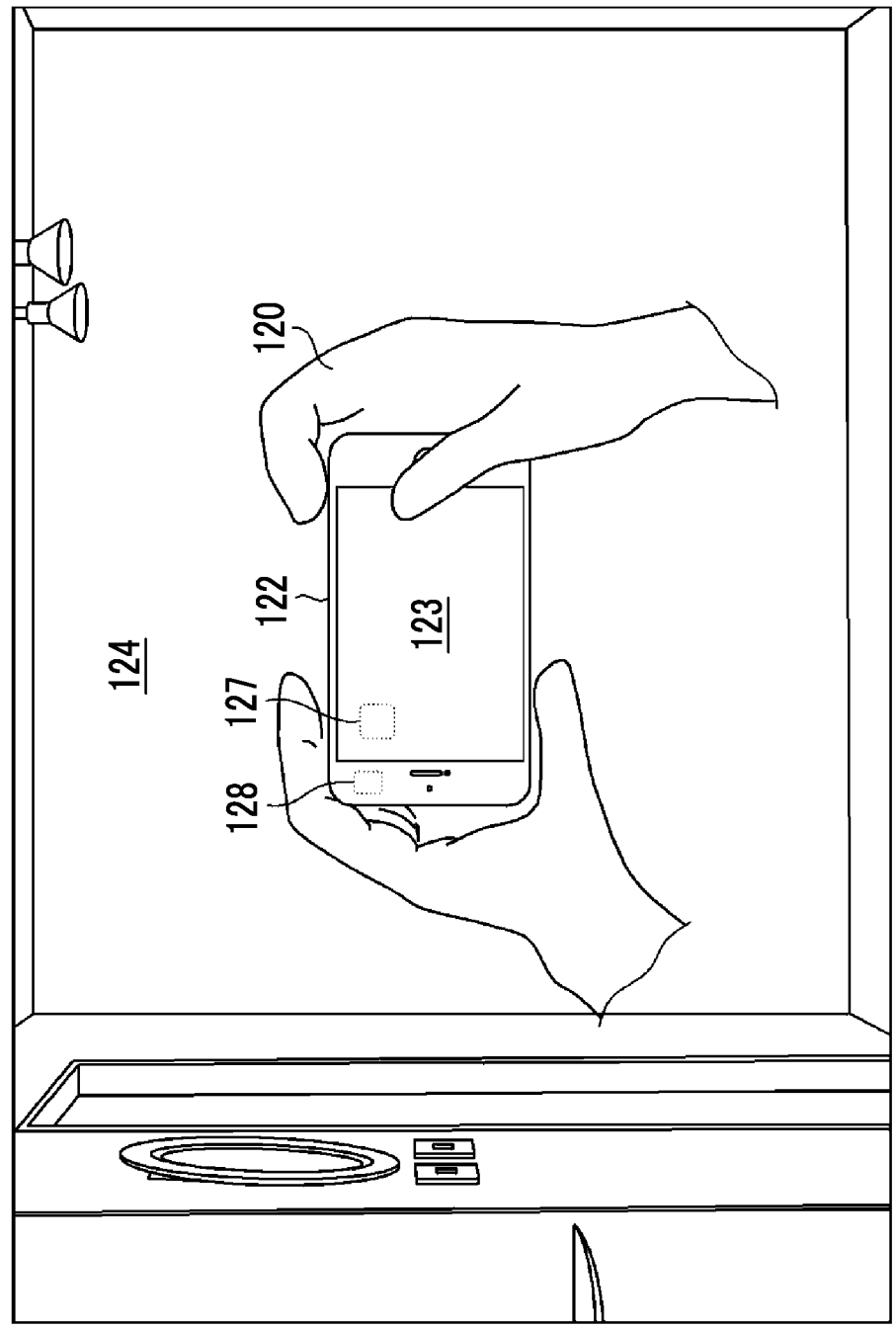
FIG. 14 is a schematic diagram of space sensing and user sensing according to an application example.

FIG. 14 is a schematic diagram of space sensing and user sensing according to an application example. Similar to the above-described embodiment, the user 120 senses the space using the first camera 127 of the smart device 122, and senses the user using the second camera 128 of the smart device 122. Of course, the user 120 may be sensed by using the heart rate measuring device 144 shown in FIG. 11.

[Generation of Attention Level Map and Goodness-of-Fit Map]

The generation of the attention level map and the generation of the goodness-of-fit map are performed in the same manner as in the above-described embodiment. Here, the explanation of generation the attention level map and the generation of the goodness-of-fit map will be omitted. That is, the attention level map 200 is generated on the basis of the space information 130 and the user information, and the goodness-of-fit map 220 is generated on the basis of the space information 130 and the object information.

[Layout Proposal]

Figure 15:
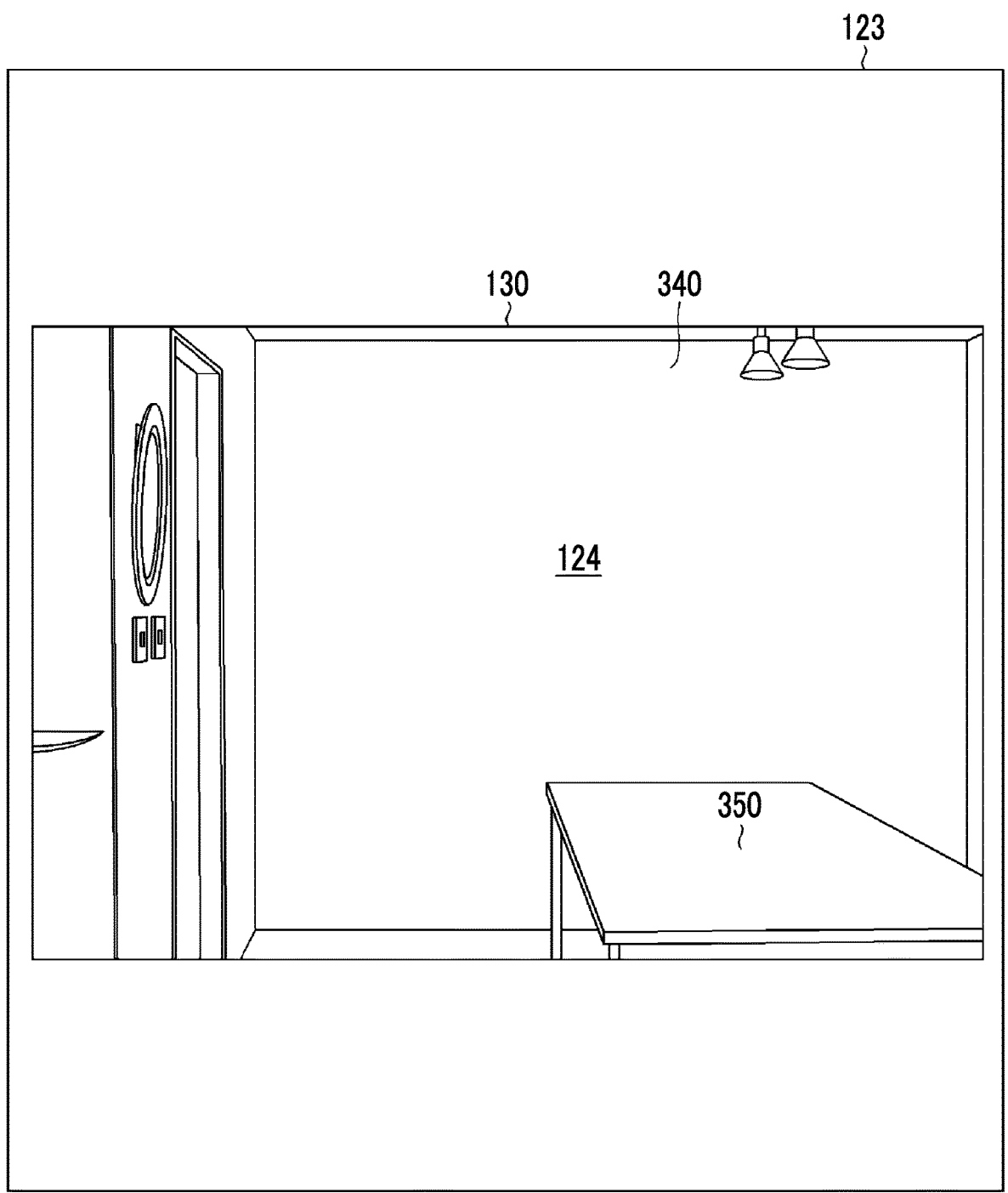
FIG. 15 is a schematic diagram of a layout proposal according to an application example.

FIG. 15 is a schematic diagram of a layout proposal according to an application example. The layout image 340 shown in FIG. 15 represents a proposal of an optimal layout of the table 350 in the inside 124 of the room. The layout image 340 is displayed on the display apparatus 123.

Figure 16:
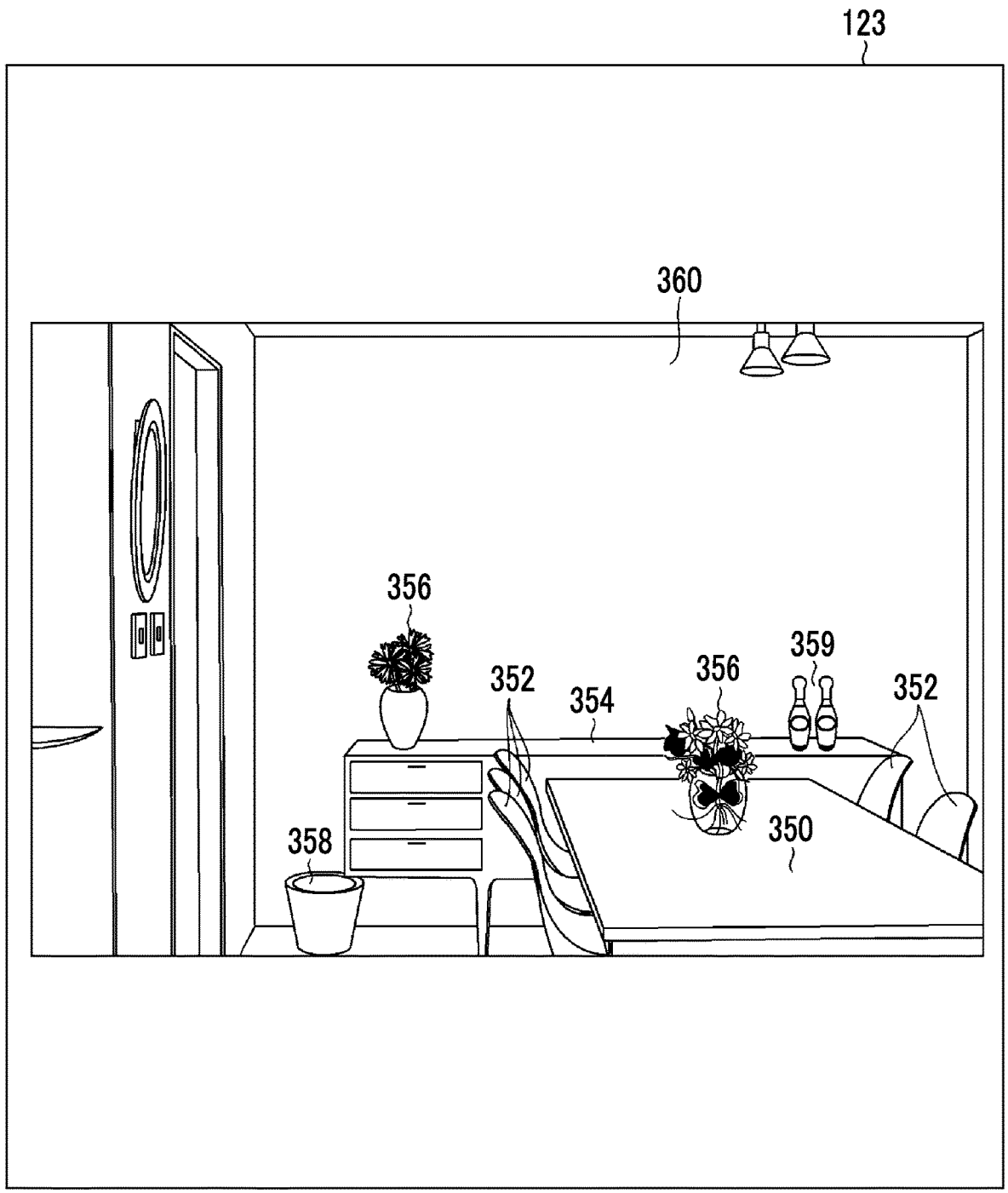
FIG. 16 is a schematic diagram of another example of a layout proposal according to an application example.

FIG. 16 is a schematic diagram of another example of a layout proposal according to an application example. The layout image 360 shown in FIG. 16 shows a proposal of the optimum layout of a plurality of objects in the inside 124 of the room.

In the layout image 360 shown in FIG. 16, a table 350, a plurality of chairs 352, a sideboard 354, a plurality of vases 356, a trash can 358, and a figurine 359 are applied as a plurality of objects.

[Flowchart of Information Processing Method]

Figure 17:
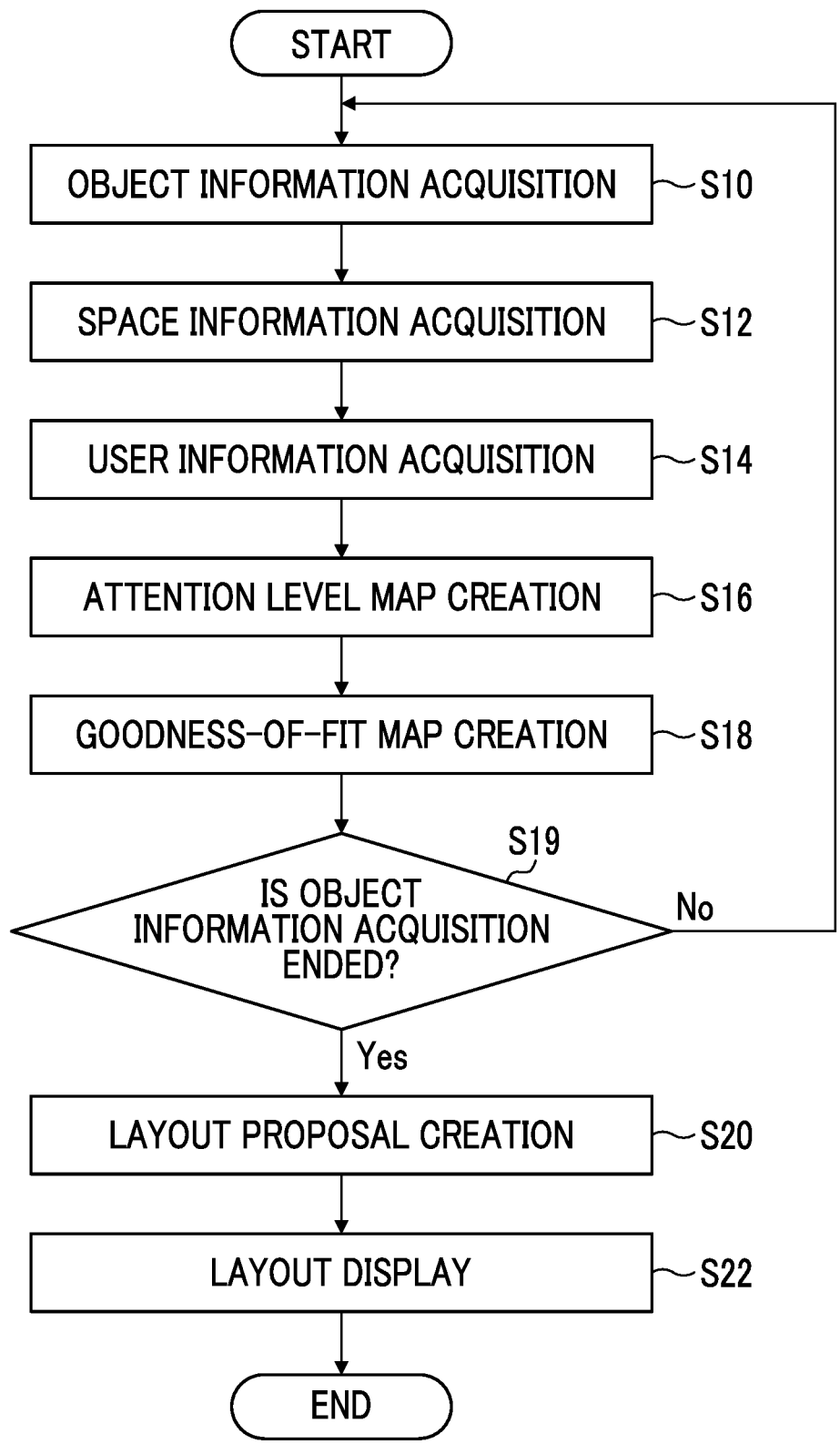
FIG. 17 is a flowchart showing a procedure of an information processing method according to an application example.

FIG. 17 is a flowchart showing a procedure of an information processing method according to an application example. The flowchart shown in FIG. 17 is applied in a case of proposing the disposition of a plurality of objects. In the flowchart showing the procedure in FIG. 17, an object information acquisition end determination step S19 is added to the flowchart shown in FIG. 9.

In the flowchart shown in FIG. 17, after the goodness-of-fit map creation step S18, the process proceeds to the object information acquisition end determination S19. In the object information acquisition end determination S19, the object information acquisition unit 12 determines whether or not to end the acquisition of the object information.

In a case of disposing furniture inside 124 of the room, it may be proposed to dispose a plurality of objects such as the table 350 and the chair 352, as shown in FIG. 16. Therefore, in the object information acquisition end determination S19, the object information acquisition unit 12 determines whether or not other object information has been acquired.

In the object information acquisition end determination S19, in a case where it is determined that the object information acquisition unit 12 acquires other object information, it is determined as No, and the process proceeds to the object information acquisition step S10.

Thereafter, until it is determined as Yes in the object information acquisition end determination S19, each step from the object information acquisition step S10 to the goodness-of-fit map creation step S18 are repeatedly performed.

On the other hand, in the object information acquisition end determination S19, in a case where it is determined that the object information acquisition unit 12 ends the acquisition of the object information, it is determined as Yes, and the process proceeds to the layout proposal creation step S20. In a case where the layout proposal creation step S20 and the display step S22 are executed, the information processing apparatus 10 ends the information processing method.

[Action and Effect of Application Example]

According to the information processing apparatus and the information processing method according to the application example, the following action and effect can be obtained.

[1]

Furniture is selected as the object. This makes it possible to propose the layout of the furniture in the inside 124 of the room.

[2]

A plurality of objects can be selected. This makes it possible to propose the optimum object layout personalized to the user 120 including a plurality of objects.

[Application Example to Network System]

Figure 18:
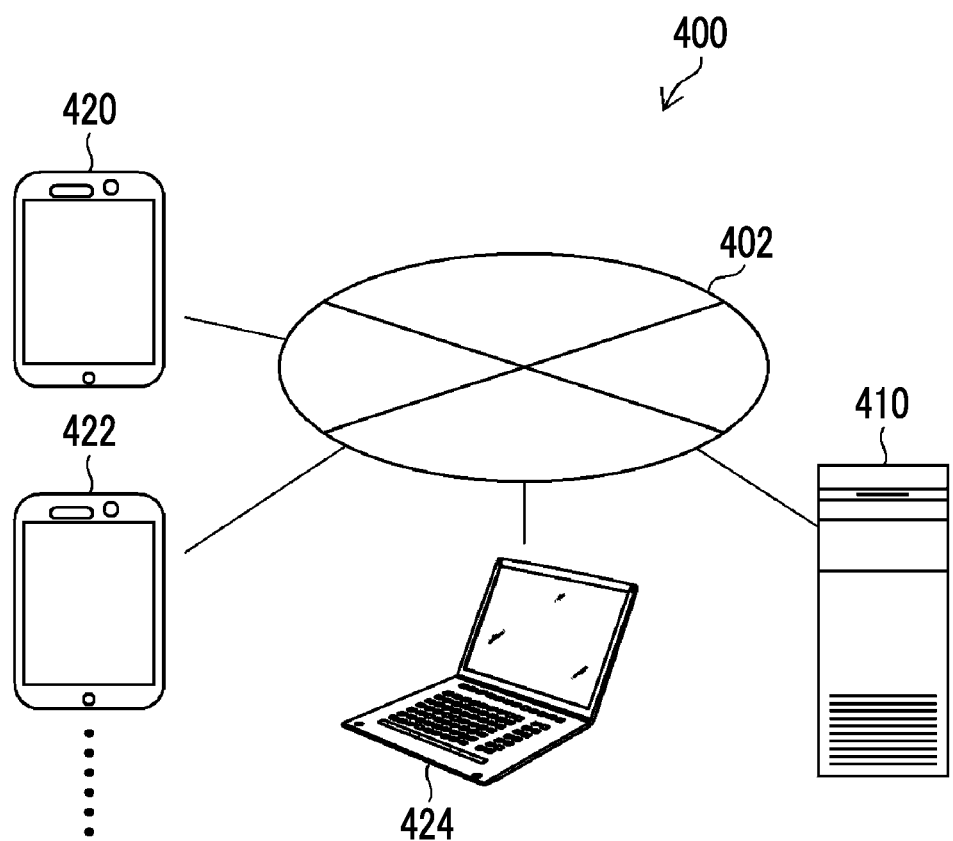
FIG. 18 is a block diagram of an information processing system according to an application example to a network system.

FIG. 18 is a block diagram of an information processing system according to an application example to a network system. An information processing system 400 shown in FIG. 18 comprises a server apparatus 410. The server apparatus 410, the first user terminal 420, the second user terminal 422, and the third user terminal 424 are communicably connected via a network 402. The information processing system 400 may comprise a large capacity memory device such as a storage apparatus that is communicably connected via the network 402.

A wide area communication network such as a wide area network (WAN) may be applied to the network 402, or a premises communication network such as a local area network (LAN) may be applied. The network 402 is not limited in a communication method, a communication protocol, and the like. It should be noted that the network 50 shown in FIG. 2 can be applied to the network shown in FIG. 18.

As the server apparatus 410, the information processing apparatus 10 explained with reference to FIG. 1 to FIG. 17 is applied. In the embodiment shown in FIG. 18, the display controller 52, the input and output interface 54, the input controller 56, the display unit 60, and the operation unit 62 shown in FIG. 2 may be omitted.

In the server apparatus 410 shown in FIG. 18, the storage apparatus 44 shown in FIG. 2 may be communicably connected to the server apparatus 410 via the network 402. In addition, the object database 34 shown in FIG. 1 may be communicably connected to the server apparatus 410, the first user terminal 420, and the like via the network 402.

FIG. 18 shows an example in which a portable terminal is applied as the first user terminal 420 and the second user terminal 422, and a notebook type personal computer is applied as the third user terminal 424. The user terminal such as the first user terminal 420 may be any device that is communicably connected to the server apparatus 410 via the network 402.

The information processing system 400 may comprise a printer communicably connected to the server apparatus 410 via the network 402. An example of a printer includes a printing apparatus disposed at the storefront of a store that provides a printing service.

[Application Example to Program]

The information processing apparatus 10 and the information processing method described above can be configured as a program for realizing a function corresponding to each unit in the information processing apparatus 10 or a function corresponding to each step in the information processing method by using a computer.

Examples of functions corresponding to each step include a space information acquisition function, an object information acquisition function, a user information acquisition function, an attention level map creation function, a goodness-of-fit map creation function, and a proposing function.

The space information acquisition function acquires space information based on the space sensing information obtained by sensing the space in which the object is disposed. The object information acquisition function acquires the object information of the object. In a case of sensing the space, the user information acquisition function acquires user information based on the user sensing information obtained by sensing the state of the user with respect to the space.

The attention level map creation function creates an attention level map showing an attention level of a user for each local area of the space on the basis of the space information and the user information. The goodness-of-fit map creation function creates a goodness-of-fit map showing a goodness-of-fit of an object for each local area on the basis of the space information and the object information. The proposing function proposes a disposition of an object in space on the basis of the attention level map and the goodness-of-fit map.

The function corresponding to each step may include a display signal transmission function of transmitting a display signal representing the disposition of the object to the display apparatus, and a transmission function of transmitting print data of an image representing the disposition of the object to the printer.

The program for making the computer realize the information processing function described above can be stored in a computer-readable information storage medium, which is a tangible non-temporary information storage medium, and the program can be provided through the information storage medium. In addition, instead of an aspect in which the program is stored and provided in the non-temporary information storage medium, an aspect in which the program signal is provided via the network is also possible.

[About Combination of Embodiment and Modification Example]

The constitutional elements explained in the above-described embodiment and the constitutional element explained in the application example and the like can be used in combination as appropriate, and some constitutional element can be replaced.

In the embodiment of the present invention described above, the constituent requirements can be appropriately changed, added, or deleted without departing from the spirit of the present invention. The present invention is not limited to the embodiments described above, and many modifications can be made by a person having ordinary knowledge in the art within the technical idea of the present invention.

EXPLANATION OF REFERENCES

10: information processing apparatus
12: object information acquisition unit
14: space information acquisition unit
16: space information storage unit
18: user information acquisition unit
20: user information storage unit
22: attention level map creation unit
22A: attention level map creation unit
22B: input layer
22C: intermediate layer
22D: output layer
22E: convolutional layer
22F: pooling layer
22G: total coupling layer
24: goodness-of-fit map creation unit
26: proposing unit
28: bus
30: space sensor
32: user sensor
34: object database
40: controller
42: memory
44: storage apparatus
46: network controller
48: power supply apparatus
50: network
52: display controller
54: input and output interface
56: input controller
60: display unit
62: operation unit
100: object selection screen
102: object list
104: first image
106: second image
108: third image
110: enlarged image
112: OK button
120: user
120A: user
122: smart device
123: display apparatus
124: inside of room
125: object
126: frame
127: first camera
128: second camera
130: space information
144: heart rate measuring device
200: attention level map
202: attention level score
204: attention level score
206: attention level score
220: goodness-of-fit map
222: goodness-of-fit score
224: goodness-of-fit score
226: goodness-of-fit score 240: layout image
250: object information
252: size information
254: material information
300: object selection screen
302: object list
304: chair image
306: vase image
308: trash can image
310: table image
312: OK button
340: layout image
350: table
352: chair
354: sideboard
356: vase
358: trash can
359: figurine
360: layout image
400: information processing system
402: network
410: server apparatus
420: first user terminal
422: second user terminal
424: third user terminal

What is claimed is:

1. An information processing apparatus comprising:
a space information acquisition unit that acquires space sensing information obtained by sensing a space in which an object is disposed and acquires space information based on the space sensing information;
an object information acquisition unit that acquires object information of the object;
a user information acquisition unit that acquires user sensing information obtained by sensing a state of a user with respect to the space and acquires user information based on the user sensing information in a case of sensing the space;
an attention level map creation unit that creates an attention level map showing an attention level of the user for each local area of the space on the basis of the space information and the user information;
a goodness-of-fit map creation unit that creates a goodness-of-fit map showing a goodness-of-fit of the object for each local area of the space information and the object information; and
a proposing unit that proposes a disposition of the object in the space on the basis of the attention level map and the goodness-of-fit map,
wherein the user information acquisition unit acquires at least one of a heart rate of the user, a blood pressure of the user, a body temperature of the user, a brain wave of the user, or a respiratory rate of the user measured by using a biological information measuring apparatus for measuring biological information of the user as the user sensing information.

2. The information processing apparatus according to claim 1,
wherein the user information acquisition unit acquires imaging data obtained by imaging the user using an imaging apparatus as the user sensing information, and acquires at least one of an expression of the user, a line of sight of the user, or a size of a pupil of the user as the user information on the basis of the user sensing information.

3. The information processing apparatus according to claim 1,
wherein the space information acquisition unit acquires imaging data obtained by imaging the space using an imaging apparatus for imaging the space as the space sensing information.

4. The information processing apparatus according to claim 3,
wherein the user information acquisition unit acquires imaging data obtained by imaging the user using an imaging apparatus as the user sensing information, and acquires at least one of an expression of the user, a line of sight of the user, or a size of a pupil of the user as the user information on the basis of the user sensing information.

5. The information processing apparatus according to claim 1,
wherein the space information acquisition unit acquires information on a constitutional element of the space from imaging data obtained by imaging the space using an imaging apparatus for imaging the space.

6. The information processing apparatus according to claim 5,
wherein the user information acquisition unit acquires imaging data obtained by imaging the user using an imaging apparatus as the user sensing information, and acquires at least one of an expression of the user, a line of sight of the user, or a size of a pupil of the user as the user information on the basis of the user sensing information.

7. The information processing apparatus according to claim 1,
wherein the space information acquisition unit acquires at least one of the information on a width of the space, a shape of the space, a color of the space, or light of the space as the space information.

8. The information processing apparatus according to claim 7,
wherein the user information acquisition unit acquires imaging data obtained by imaging the user using an imaging apparatus as the user sensing information, and acquires at least one of an expression of the user, a line of sight of the user, or a size of a pupil of the user as the user information on the basis of the user sensing information.

9. The information processing apparatus according to claim 1,
wherein the object information acquisition unit acquires at least one of a size of the object, a shape of the object, or a color of the object as the object information.

10. The information processing apparatus according to claim 9,
wherein the user information acquisition unit acquires imaging data obtained by imaging the user using an imaging apparatus as the user sensing information, and acquires at least one of an expression of the user, a line of sight of the user, or a size of a pupil of the user as the user information on the basis of the user sensing information.

11. The information processing apparatus according to claim 1,
wherein the proposing unit creates image data representing the space in which the object is disposed.

12. The information processing apparatus according to claim 11,
wherein the user information acquisition unit acquires imaging data obtained by imaging the user using an imaging apparatus as the user sensing information, and acquires at least one of an expression of the user, a line of sight of the user, or a size of a pupil of the user as the user information on the basis of the user sensing information.

13. The information processing apparatus according to claim 11, further comprising:
a signal transmission unit that transmits a signal representing the image data to a display apparatus.

14. The information processing apparatus according to claim 11, further comprising:
a signal transmission unit that transmits the image data to a printing apparatus.

15. The information processing apparatus according to claim 1,
wherein the proposing unit maps a score representing a degree of goodness-of-fit of the disposition of the object to the space on the basis of a height of a line of sight of the user.

16. An information processing system comprising:
a server apparatus that is connected to a network,
wherein the server apparatus includes
a space information acquisition unit that acquires space sensing information obtained by sensing a space in which an object is disposed and acquires space information based on the space sensing information;
an object information acquisition unit that acquires object information of the object;
a user information acquisition unit that acquires user sensing information obtained by sensing a state of a user with respect to the space and acquires user information based on the user sensing information in a case of sensing the space;
an attention level map creation unit that creates an attention level map showing an attention level of the user for each local area of the space on the basis of the space information and the user information;
a goodness-of-fit map creation unit that creates a goodness-of-fit map showing a goodness-of-fit of the object for each local area on the basis of the space information and the object information; and
a proposing unit that proposes a disposition of the object in the space on the basis of the attention level map and the goodness-of-fit map,
wherein the user information acquisition unit acquires at least one of a heart rate of the user, a blood pressure of the user, a body temperature of the user, a brain wave of the user, or a respiratory rate of the user measured by using a biological information measuring apparatus for measuring biological information of the user as the user sensing information.

17. An information processing method comprising:
a space information acquisition step of acquiring space sensing information obtained by sensing a space in which an object is disposed and acquiring space information based on the space sensing information;
an object information acquisition step of acquiring object information of the object;
a user information acquisition step of acquiring user sensing information obtained by sensing a state of a user with respect to the space and acquiring user information based on the user sensing information in a case of sensing the space;
an attention level map creation step of creating an attention level map showing an attention level of the user for each local area of the space on the basis of the space information and the user information;
a goodness-of-fit map creation step of creating a goodness-of-fit map showing a goodness-of-fit of the object for each local area on the basis of the space information and the object information; and
a proposing step of proposing a disposition of the object in the space on the basis of the attention level map and the goodness-of-fit map,
wherein the method further comprises acquiring at least one of a heart rate of the user, a blood pressure of the user, a body temperature of the user, a brain wave of the user, or a respiratory rate of the user measured by using a biological information measuring apparatus for measuring biological information of the user as the user sensing information.

18. A non-transitory computer readable recording medium storing a program for causing a computer to implement:
a space information acquisition function of acquiring space sensing information obtained by sensing a space in which an object is disposed and acquiring space information based on the space sensing information;
an object information acquisition function of acquiring object information of the object;
a user information acquisition function of acquiring user sensing information obtained by sensing a state of a user with respect to the space and acquiring user information based on the user sensing information in a case of sensing the space;
an attention level map creation function of creating an attention level map showing an attention level of the user for each local area of the space on the basis of the space information and the user information;
a goodness-of-fit map creation function of creating a goodness-of-fit map showing a goodness-of-fit of the object for each local area on the basis of the space information and the object information; and
a proposing function of proposing a disposition of the object in the space on the basis of the attention level map and the goodness-of-fit map,
wherein the program further causes the computer to implement a function of acquiring at least one of a heart rate of the user, a blood pressure of the user, a body temperature of the user, a brain wave of the user, or a respiratory rate of the user measured by using a biological information measuring apparatus for measuring biological information of the user as the user sensing information.

* * * * *